United States Patent
Nagashima

(10) Patent No.: US 11,754,714 B2
(45) Date of Patent: Sep. 12, 2023

(54) RECOGNITION SENSOR AND CONTROL METHOD THEREOF, AUTOMOBILE, AUTOMOTIVE LAMP, OBJECT RECOGNITION SYSTEM, AND OBJECT RECOGNITION METHOD

(71) Applicant: KOITO MANUFACTURING CO., LTD., Tokyo (JP)

(72) Inventor: Toru Nagashima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 668 days.

(21) Appl. No.: 16/792,505

(22) Filed: Feb. 17, 2020

(65) Prior Publication Data

US 2020/0183007 A1 Jun. 11, 2020

Related U.S. Application Data

(63) Continuation of application No. PCT/JP2018/028978, filed on Aug. 2, 2018.

(30) Foreign Application Priority Data

Aug. 18, 2017 (JP) .................................. 2017-157944
Aug. 25, 2017 (JP) .................................. 2017-162607
Mar. 9, 2018 (JP) .................................. 2018-043457

(51) Int. Cl.
G01S 17/48 (2006.01)
G01S 7/481 (2006.01)
G01S 17/42 (2006.01)

(52) U.S. Cl.
CPC ............ *G01S 17/48* (2013.01); *G01S 7/4812* (2013.01); *G01S 17/42* (2013.01)

(58) Field of Classification Search
CPC .......... G01S 17/48; G01S 7/4812; G01S 17/42
See application file for complete search history.

(56) References Cited

U.S. PATENT DOCUMENTS 5,983,161 A 11/1999 Lemelson et al.
2004/0024660 A1* 2/2004 Ganesh ................ G06Q 10/087
705/28

(Continued)

FOREIGN PATENT DOCUMENTS

CN 106599869 A 4/2017
JP 2002-140790 A 5/2002

(Continued)

OTHER PUBLICATIONS

Ohsato et al., "A Method of 2D Environmental Map Generation and Localization using Visual Odometry and 3D-LIDAR", No. 14-2 Proceedings of the 2014 JSME Conference on Robotics and Mechatronics, Toyama, Japan, May 25-29, 2014. (3 pages).

(Continued)

*Primary Examiner* — Behrang Badii
*Assistant Examiner* — Jay Khandpur
(74) *Attorney, Agent, or Firm* — BUCHANAN INGERSOLL & ROONEY PC

(57) ABSTRACT

A recognition sensor includes a three-dimensional sensor and a controller. The three-dimensional sensor scans a scan beam in the horizontal direction, and measures the distance up to each of multiple measurement points defined on a scan line. The controller corrects the elevation angle of the three-dimensional sensor such that the height of a correction point, which is selected from among the multiple measurement points, approaches a predetermined value.

8 Claims, 21 Drawing Sheets

(56) References Cited

U.S. PATENT DOCUMENTS

| | | |
|---|---|---|
| 2004/0036261 A1 | 2/2004 | Breed |
| 2007/0182528 A1 | 8/2007 | Breed et al. |
| 2007/0282506 A1 | 12/2007 | Breed et al. |
| 2011/0292217 A1* | 12/2011 | Ohta ..................... G01S 3/7864 348/169 |
| 2014/0207411 A1* | 7/2014 | Laurent .................. G01B 11/26 702/158 |
| 2014/0214271 A1* | 7/2014 | Choi ................... B60W 30/095 701/36 |
| 2015/0015895 A1* | 1/2015 | Bridges ............... G01B 11/005 356/614 |
| 2017/0075330 A1* | 3/2017 | Matsunami ............. G01S 7/003 |
| 2017/0075356 A1 | 3/2017 | Delp |
| 2017/0225610 A1* | 8/2017 | Lang .................... B60Q 1/0023 |
| 2017/0303819 A1* | 10/2017 | Nothacker ............. G08B 21/18 |
| 2017/0369016 A1* | 12/2017 | Gurghian ............... E05F 15/40 |
| 2018/0046896 A1* | 2/2018 | Yu .......................... G06N 3/045 |
| 2019/0176841 A1* | 6/2019 | England ................ B60W 10/04 |
| 2020/0364570 A1* | 11/2020 | Kitamura ............. G06V 10/764 |

FOREIGN PATENT DOCUMENTS

| | | | | |
|---|---|---|---|---|
| JP | 2005-043247 A | | 2/2005 | |
| JP | 2009-098023 A | | 5/2009 | |
| JP | 2009168472 A | * | 7/2009 | |
| JP | 2011247619 A | | 12/2011 | |
| JP | 2017-056935 A | | 3/2017 | |
| JP | 2019113507 A | * | 7/2019 | .......... G06F 3/0481 |
| JP | 2020026981 A | * | 2/2020 | |

OTHER PUBLICATIONS

International Preliminary Report on Patentability (Form PCT/IB/373) and the Written Opinion of the International Searching Authority (Form PCT/ISA/237) dated Feb. 18, 2020, in corresponding international Application No. PCT/JP2018/028978. (28 pages).

International Search Report (Form PCT/ISA/210) dated Oct. 9, 2018, in corresponding international Application No. PCT/JP2018/028978. (9 pages).

Office Action (Notification of Reason(s) for Refusal) dated Aug. 9, 2022, in corresponding Japanese Patent Application No. 2019-536727 and English translation of the Office Action. (9 pages).

Office Action (Notification of Reason(s) for Refusal) dated Apr. 26, 2022, in corresponding Japanese Patent Application No. 2019-536727 and English translation of the Office Action. (12 pages).

Office Action dated Feb. 28, 2023, in corresponding Chinese Patent Application No. 201880053552.5 and English translation of the Office Action (40 pages).

* cited by examiner $LD_8 \sim LD_1$

FIG. 22

| Category | Accuracy rate |
|---|---|
| Total | 0.684 |
| Human - 0th | 0.675 |
| Human - 1st | 0.650 |
| Human - 2nd | 0.631 |
| Human - 3rd | 0.308 |
| Human - 4th | 0.708 |
| Human - 5th | 0.644 |
| Human - 6th | 0.506 |
| Human - 7th | 0.314 |
| Car - 0th | 0.483 |
| Car - 1st | 0.790 |
| Car - 2nd | 0.523 |
| Car - 3rd | 0.657 |
| Car - 4th | 0.813 |
| Car - 5th | 0.060 |
| Car - 6th | 0.277 |
| Car - 7th | 1.000 |
| Bicycle - 0th | 0.844 |
| Bicycle - 1st | 0.547 |
| Bicycle - 2nd | 0.633 |
| Bicycle - 3rd | 0.661 |
| Bicycle - 4th | 0.458 |
| Bicycle - 5th | 0.917 |
| Bicycle - 6th | 0.606 |
| Bicycle - 7th | 0.550 |
| Pole - all | 0.999 |

FIG. 23

| Category | Accuracy rate |
|---|---|
| Total | 0.994 |
| Human | 1.000 |
| Car | 1.000 |
| Bicycle | 0.978 |
| Pole | 1.000 |

RECOGNITION SENSOR AND CONTROL METHOD THEREOF, AUTOMOBILE, AUTOMOTIVE LAMP, OBJECT RECOGNITION SYSTEM, AND OBJECT RECOGNITION METHOD

BACKGROUND OF THE INVENTION

1. Field of the Invention

The present invention relates to a recognition sensor or a system that detect the shape of an object.

2. Description of the Related Art

Candidates of vehicle sensors include LiDAR (Light Detection and Ranging, Laser Imaging Detection and Ranging), cameras, millimeter-wave radars, ultrasonic sonars, and so forth. In particular, LiDAR has advantages as compared with other sensors. Examples of such advantages include: (i) an advantage of being capable of recognizing an object based on point group data; (ii) an advantage in employing active sensing of providing high-precision detection even in bad weather conditions; (iii) an advantage of providing wide-range measurement; etc. Accordingly, LiDAR is anticipated to become mainstream in vehicle sensing systems.

FIGS. 1A and 1B are diagrams for explaining sensing provided by LiDAR. A LiDAR 2 scans a scan beam BM in the horizontal direction with a fixed elevation angle φ so as to measure the distances r up to multiple measurement points P on an object OBJ.

FIG. 1B shows a state in which the scan line SL passes through the knees of a pedestrian. The shape of the object OBJ is measured along multiple scan lines SL with several different elevation angles φ. This allows the class of the object OBJ to be identified.

As a result of investigating object recognition by means of three-dimensional sensing using LiDAR or the like, the present inventor has come to recognize the following several problems.

Problem 1

With the object recognition using LiDAR, an image measured for object recognition is required to be the same as an image measured beforehand in machine learning. Machine learning involves an enormous amount of time and cost. Accordingly, there is a demand for using a given machine learning result for various kinds of products.

However, there can be a difference in the number of LiDAR scan lines and the elevation angle of each scan line between various kinds of LiDAR products. FIG. 2 is a diagram for explaining the sensing provided by two LiDARs having different specifications. Scan beams $BM_1$ and $BM_2$ represent the outputs of the two LiDARs having different specifications. The scan beams BM with different elevation angles φ are used to scan different portions of the object OBJ, thereby providing different images.

As shown in FIG. 2, in a case in which there is a large difference in specifications between an in-vehicle LiDAR and a LiDAR used for machine learning (i.e., there is a large difference in the elevation angle between the corresponding scan lines), it can be considered that this leads to degraded recognition precision. In order to provide high-precision recognition, there is a need to perform machine learning using the same LiDAR product to be mounted on a vehicle (or a product that provides at least the same elevation angle). This leads to a large increase in development costs.

Even in a case in which the machine learning is performed using a LiDAR having the same specifications as those of the in-vehicle LiDAR, the in-vehicle LiDAR requires careful installation angle alignment when it is installed on a vehicle. In other words, this restricts the degree of freedom in mounting the LiDAR.

Problem 2

FIG. 3 is a diagram for explaining a problem 2. FIG. 3 shows a virtual screen SCRN. The virtual screen SCRN is a flat plane. A center measurement point $P_1$ is defined such that it provides a minimum horizontal distance $R_1$ up to the LiDAR2. The horizontal distance R becomes larger according to an increase in the distance from the center up to a given measurement point such as $P_2$, $P_3$, or the like. As a result, there is a difference in the height h between the multiple measurement points P.

FIG. 4A is a diagram showing multiple scan lines when a vehicle is measured from a side. When the elevation angle φ=0°, the height of the scan line SL is maintained at a constant level. However, when the elevation angle φ is non-zero, the height of the scan line changes according to the scan angle θ. That is to say, in a case of measuring an object such as a vehicle having a large width, this leads to distortion of a measured image at both ends. This is the problem 2.

Problem 3

FIG. 4B is a diagram showing multiple scan lines when a pedestrian is measured. There is a difference in portions measured by the multiple scan lines between a case in which an object OBJ such as a pedestrian having a small width is positioned at the center and a case in which such an object OBJ is positioned at an end. This is the problem 3.

Problem 4

FIG. 5 is a diagram for explaining the problem 4. FIG. 5 is a diagram showing the dependence of the height h on the horizontal distance R when the scan angle θ is set to a fixed angle. As can be understood from FIG. 5, in a case of measuring the same object OBJ with a constant elevation angle, the portion measured by the same scan line changes according to a change in the horizontal distance R. In the example shown in FIG. 5, the abdomen, upper legs, and knees are measured using the same beam at the horizontal distances $R_1$, $R_2$, and $R_3$, respectively.

The problems 1 through 4 introduce significant complexity to the design of an identifier configured to identify the class (category) of the object OBJ. Otherwise, in some cases, such problems lead to degradation of identification probability in the final stage.

Problem 5

The precision of object recognition based on the point group data generated by the LiDAR increases according to an increase in the resolution of the point group data. However, this involves a drastic increase in calculation costs. In consideration of a case in which the LiDAR is mounted on a vehicle, in some cases, it may be necessary to mount a low-cost, low-end processing device. In this case, such an arrangement naturally requires the number of scan lines to be reduced.

SUMMARY OF THE INVENTION

The present invention has been made in view of such a situation. Accordingly, it is an exemplary purpose of an embodiment of the present invention to provide a recognition sensor or a system that solves at least one from among the above-described problems.

1. An embodiment of the present invention relates to a recognition sensor. The recognition sensor comprises: a three-dimensional sensor structured to be capable of setting an elevation angle; and a controller structured to control the elevation angle of the three-dimensional sensor such that the height of a correction point selected from among multiple measurement points on a scan line approaches a predetermined value.

With this embodiment, this arrangement is capable of determining the height of the correction point on the scan line. This arrangement allows at least one of the problems described above to be solved.

Also, another embodiment of the present invention relates to a recognition sensor. The recognition sensor comprises: a three-dimensional sensor structured to be capable of setting an elevation angle; and a controller structured to control the elevation angle of the three-dimensional sensor such that the height of a measurement point approaches a predetermined value regardless of the horizonal distance up to the measurement point. In this case, this arrangement is capable of suppressing a problem in that the heights of the scan lines depend on the distance.

Yet another embodiment of the present invention relates to a recognition sensor. The recognition sensor comprises: a three-dimensional sensor structured to be capable of setting an elevation angle; and a controller structured to control the elevation angle of the three-dimensional sensor such that each scan line has a constant height regardless of a scanning angle when scanning an object which is a substantially flat plane. This arrangement is capable of suppressing distortion of the scan lines.

Also, the controller may perform preliminary measurement for a correction point selected from among the multiple measurement points. Also, the elevation angle to be used in the main measurement may be calculated based on the distance and the elevation angle acquired in the preliminary measurement.

Also, the controller may correct the elevation angle for each of the measurement points.

Also, the controller may correct the elevation angle at least once for each scan line and for each object.

The controller may correct the elevation angle every time the scan is advanced by a predetermined horizontal angle or for every predetermined number of measurement points.

The controller may correct the elevation angle for each of the measurement points for each scan line.

Yet another embodiment of the present invention relates to a motor vehicle. The motor vehicle may comprise any one of the above-described recognition sensors.

Yet another embodiment of the present invention relates to an automotive lamp. The automotive lamp may comprise any one of the above-described recognition sensors.

2. Yet another embodiment of the present invention relates to an object recognition system. The object recognition system comprises: a three-dimensional sensor structured to generate a set of line data for multiple horizontal lines defined with different heights; and a processing device structured to identify the class of an object based on the set of line data. The processing device may generate a set of intermediate data based on the set of line data. Each item of the set of intermediate data is with respect to multiple classes and multiple portions of the object. The processing device may integrate the set of intermediate data so as to generate final data indicative of the class of the object.

With this embodiment, such an arrangement is capable of judging the class of the object using only a small number of horizontal lines.

Also, the set of intermediate data may be generated using a neural network. Also, each item of the set of intermediate data may represent the probabilities for the multiple portions of the multiple classes.

Also, the final data may be generated using a neural network. Also, the final data may represent the probabilities for the multiple classes.

Also, the processing device may support normalization as preprocessing in which values included in each item of the set of line data are divided by a predetermined value.

As preprocessing, the processing device may extract a region including the object from the set of line data.

The number of the multiple horizontal lines may be four to twelve.

The multiple classes of objects may include at least a pedestrian, bicycle, and motor vehicle.

Yet another embodiment relates to a motor vehicle. The motor vehicle may comprise the object recognition system described above.

Also, the three-dimensional sensor may be built into a headlamp.

Yet another embodiment of the present invention relates to an automotive lamp. The automotive lamp may comprise the object recognition system described above.

It should be noted that any combination of the components described above, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 22 is a diagram showing the classification accuracy rates for 25 categories provided by the first neural networks;

FIG. 23 is a diagram showing the classification accuracy rates for four categories provided by the second neural network;

DETAILED DESCRIPTION OF THE INVENTION

Figure 1A:
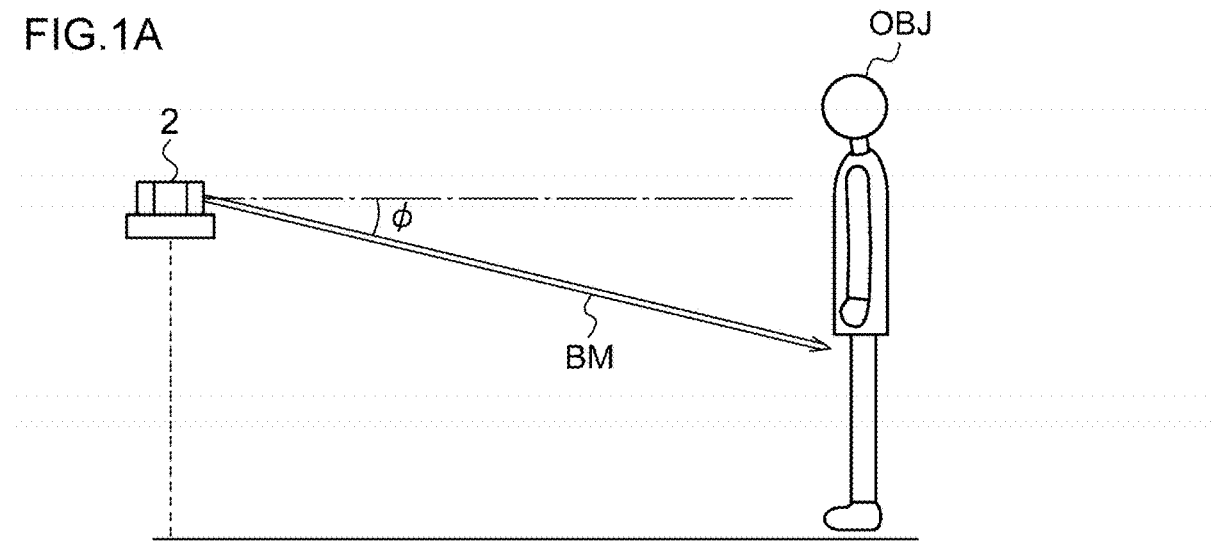
FIGS. 1A-1B are diagrams for explaining sensing provided by a LiDAR.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

First Embodiment

Figure 6:
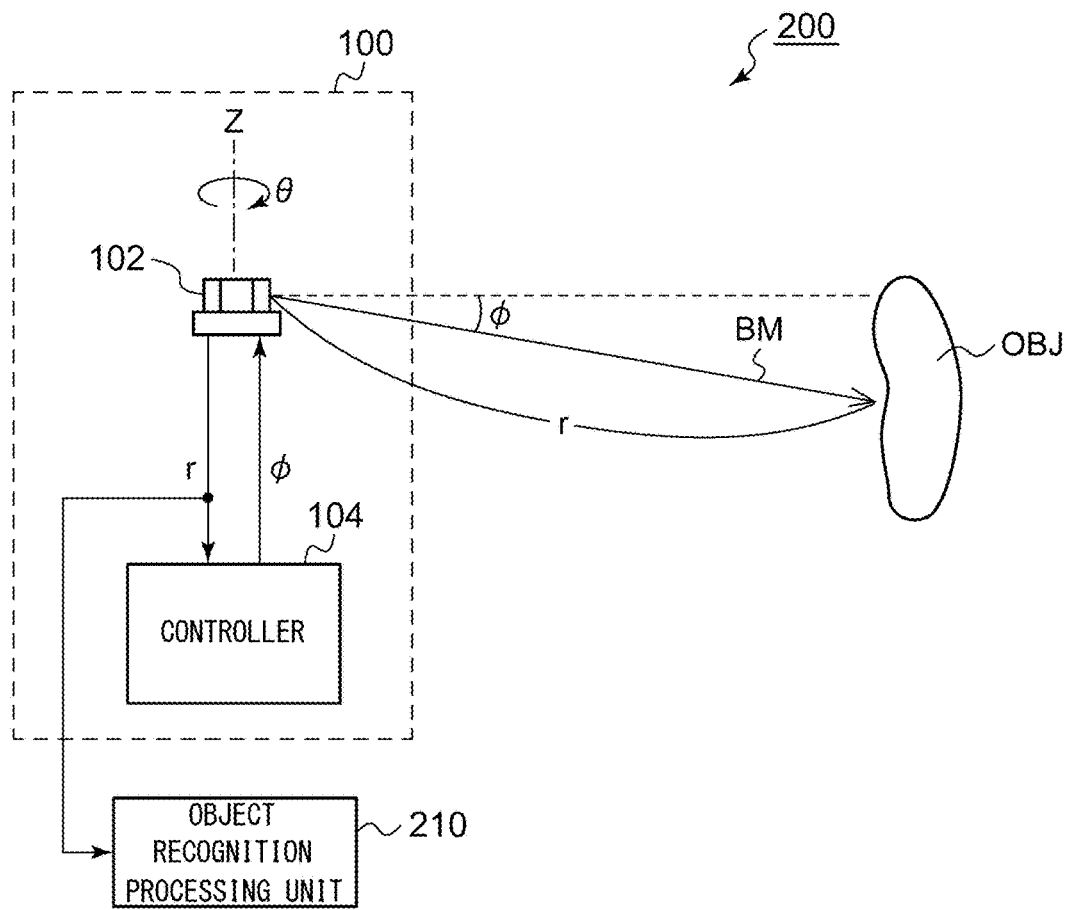
FIG. 6 is a block diagram showing an object recognition system including a recognition sensor according to a first embodiment.

FIG. 6 is a block diagram showing an object recognition system 200 including a recognition sensor 100 according to a first embodiment. The recognition sensor 100 includes a three-dimensional sensor 102 and a controller 104. The three-dimensional sensor 102 scans a scan beam BM in the horizontal direction (around the Z axis) so as to measure distances up to multiple measurement points. A line that passes through the multiple measurement points acquired for one scan will be referred to as a "scan line SL". The data acquired in this step will be referred to as "scan data". The method for identifying an object with small irregularities, such as a pedestrian, with high precision is not restricted in particular. However, in this case, a LiDAR is preferably employed. The number of scan lines N represents the so-called resolution in the vertical direction.

The three-dimensional sensor 102 is configured to be capable of adjusting the elevation angle φ. The control of the elevation angle φ is supported in order to select the scan line. In a case in which the LiDAR is configured to operate with a constant elevation angle φ, the elevation angle can be selected from N elevation angles $φ_1$ through $φ_N$ determined beforehand. The elevation angle φ is maintained at a constant value during the scan operation. N represents the number of scan lines.

The object recognition processing unit 210 identifies the class of the object OBJ based on the point group data generated by the three-dimensional sensor 102. The processing and algorithm supported by the object recognition processing unit 210 are not restricted in particular. The object recognition processing unit 210 can be configured as a combination of a processor (hardware component) such as a CPU (Central Processing Unit), GPU (Graphics Processing Unit), microcontroller, or the like, and a software program executed by the processor (hardware component). The object recognition processing unit 210 may be configured as a combination of multiple processors. Also, the functions of the object recognition processing unit 210 and the controller 104 may be supported by the same processor.

Figure 7:
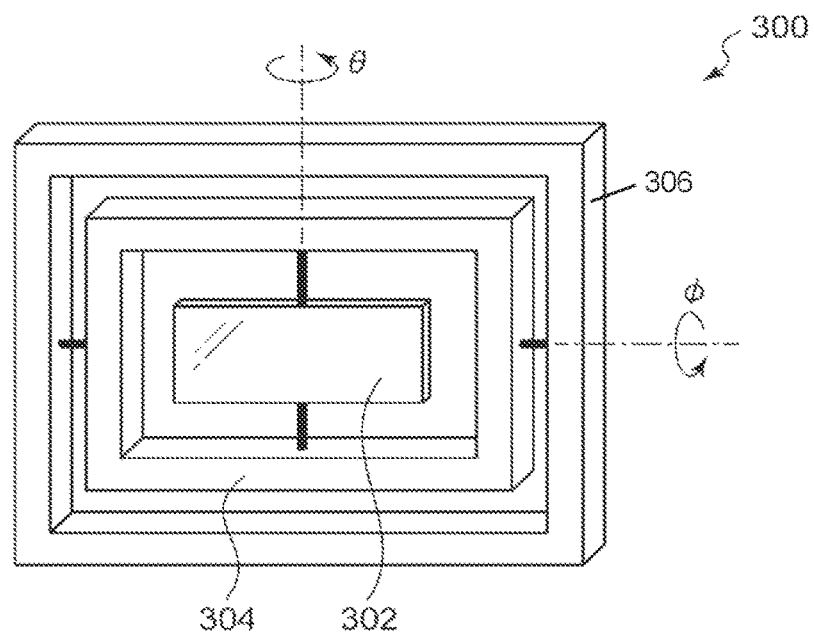
FIG. 7 is a diagram showing an example of the LiDAR configured as a three-dimensional sensor.

FIG. 7 is a diagram showing an example of a LiDAR configured as the three-dimensional sensor 102. The LiDAR 300 shown in FIG. 7 includes a MEMS scanner. The MEMS scanner includes a mirror 302 and actuators 304 and 306. The mirror 302 reflects a beam emitted from an unshown light source. The actuator 304 rotates the mirror 302 around a first axis. The actuator 306 rotates the mirror 302 around a second axis together with the actuator 304 that mounts the mirror 302. The rotation around the first axis corresponds to the control of the scan angle θ. The rotation around the second axis corresponds to the control of the elevation angle φ.

It should be noted that the configuration of the three-dimensional sensor 102 is not restricted to the example shown in FIG. 7. Rather, known devices or devices that will become available in the future may be employed. For example, non-mechanical devices such as phased-array devices or micro-prism devices may be employed. Alternatively, mechanical devices may be employed, examples of which include devices employing the above-described MEMS mirrors and devices employing motor-driven mirrors.

One of the features of the present embodiment is that the control of the elevation angle φ is used to correct the height of each scan line or to correct distortion of the scan lines. Returning to FIG. 6, the controller 104 selects at least one from among the multiple measurement points as a correction point. Furthermore, the controller 104 corrects the elevation angle φ of the three-dimensional sensor 102 such that the height of the correction point approaches a predetermined value $h_{REF}$. The controller 104 receives, as input data, the distance measurement data that represents the distance r up to the correction point. The height of the correction point can be geometrically calculated based on the elevation angle φ and the distance measurement data.

Figure 8:
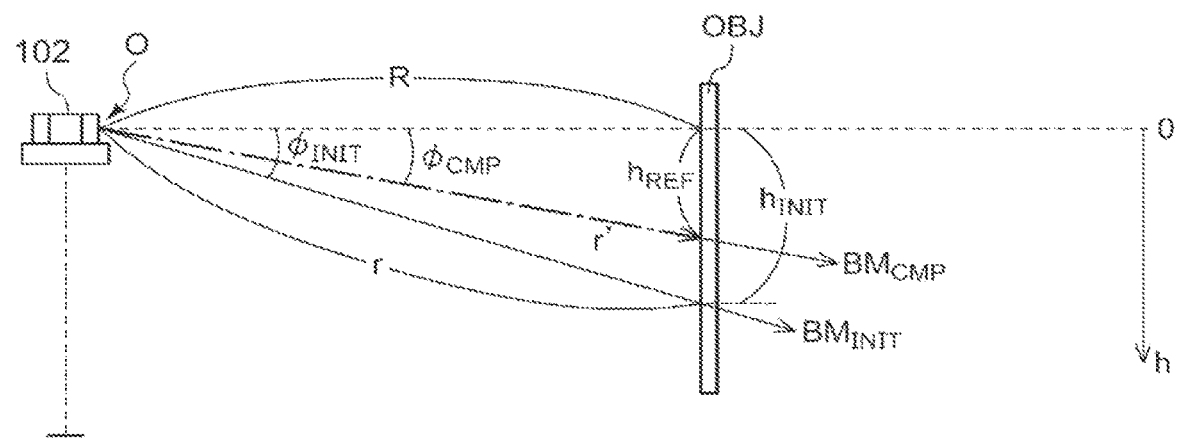
FIG. 8 is a diagram for explaining correction processing for an elevation angle $\varphi$ to be set for the three-dimensional sensor.

FIG. 8 is a diagram for explaining correction of the elevation angle φ of the three-dimensional sensor 102. FIG. 8 shows the processing for a single correction point on a single scan line. The recognition sensor 100 performs preliminary measurement for the correction processing. In the preliminary measurement, the elevation angle φ is set to an initial value $φ_{INIT}$ determined beforehand. The initial value $φ_{INIT}$ may be a unique value determined for a given scan line. Also, the initial value $φ_{INIT}$ may be an angle $φ_i$ (i=1, 2, ..., N) when the scan beam is scanned with a constant elevation angle. The scan beam $BM_{INIT}$ scanned in the preliminary measurement is indicated by the solid line.

In this state, the distance r up to the object OBJ is measured. For simplification of calculation, the height h is defined with the light source for the three-dimensional sensor 102 as a reference. The horizontal distance R up to the object OBJ can be calculated based on Expression (1) using the measured distance r and the initial elevation angle $φ_{INIT}$.

$$R = r \cdot \cos φ_{INIT} \quad (1)$$

The controller 104 calculates the elevation angle $φ_{CMP}$ to be used in the main measurement based on based on the distance r acquired in the preliminary measurement and the elevation angle $φ_{INIT}$ set in the preliminary measurement. The scan beam $BM_{CMP}$ emitted with the corrected elevation angle $φ_{CMP}$ is required to cross the object OBJ at the reference height $h_{REF}$. Accordingly, the following Expression (2) holds true.

$$\tan φ_{CMP} = h_{REF}/R \quad (2)$$

Accordingly, the corrected elevation angle $φ_{CMP}$ is acquired based on the following Expression (3).

$$φ_{CMP} = \arctan(h_{REF}/R) = \arctan(h_{REF}/(r \cdot \cos φ_{INIT})) \quad (3)$$

In the main measurement following the preliminary measurement, the three-dimensional sensor 102 sets the elevation angle to $φ_{CMP}$, and measures the distance r' up to the object OBJ again.

Figure 9:
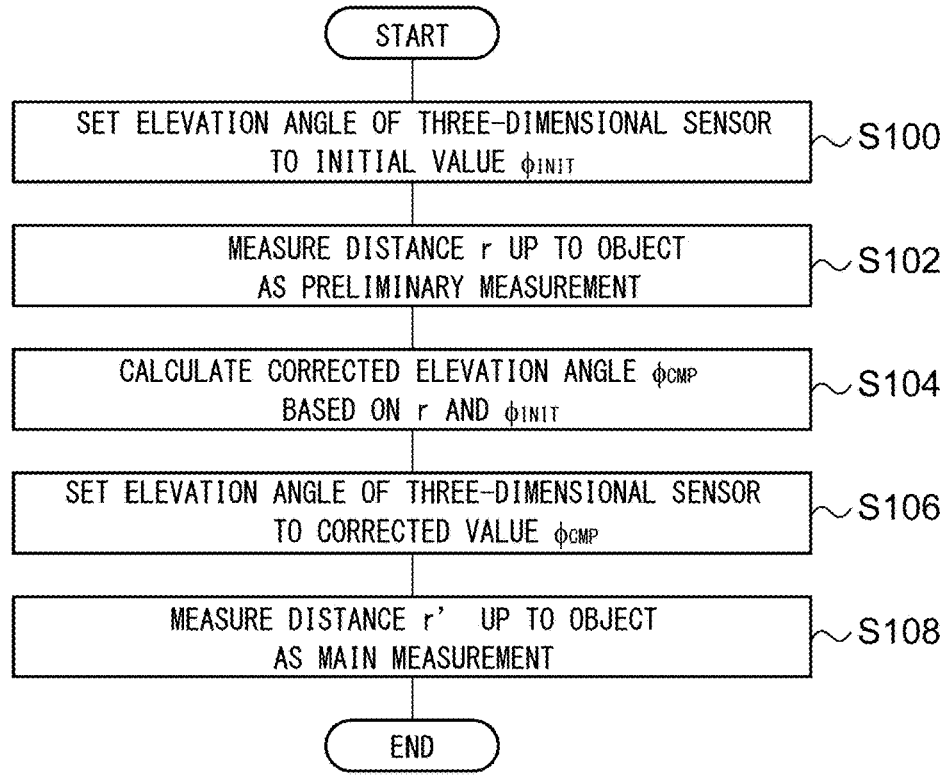
FIG. 9 is a flowchart showing the correction processing for the elevation angle φ to be set for the three-dimensional sensor.

FIG. 9 is a flowchart showing the correction processing for the elevation angle φ of the three-dimensional sensor 102. First, the elevation angle φ of the three-dimensional sensor 102 is set to the initial value $φ_{INIT}$ (S100). In this state, as the preliminary measurement, the three-dimensional sensor 102 measures the distance r up to the object OBJ (S102). The corrected elevation angle $φ_{CMP}$ is calculated based on the distance r acquired in the preliminary measurement and the initial value of the elevation angle $φ_{INIT}$ (S104). The corrected elevation angle $φ_{CMP}$ is set for the three-dimensional sensor 102 (S106). Subsequently, in the main measurement, the distance r' up to the object is measured (S108).

The above is the operation of the recognition sensor 100. With the recognition sensor 100, such an arrangement is capable of controlling the height of a given point where the scan line passes through for each scan line. Accordingly, such an arrangement is capable of solving at least one of the problems described above.

Various methods are conceivable for selecting the correction target measurement point (correction point). Description will be made below regarding several examples.

FIRST EXAMPLE

Figure 10:
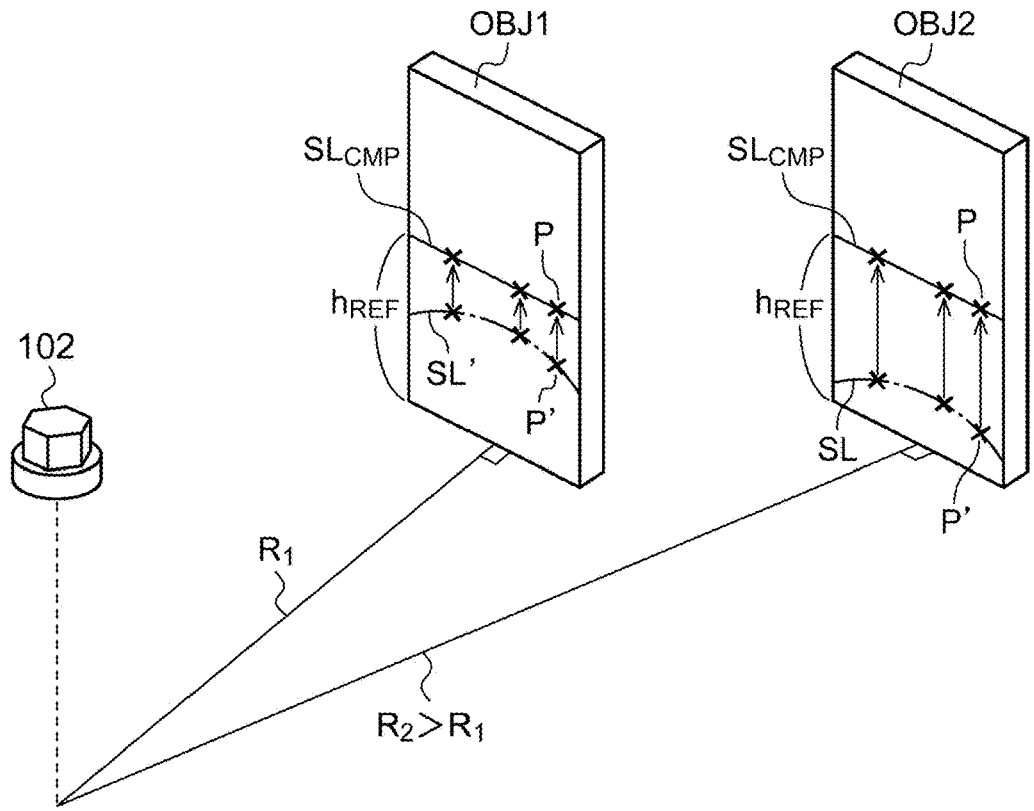
FIG. 10 is a diagram for explaining correction according to a first example.

With the first example, all the measurement points can be selected as the correction points. That is to say, the preliminary measurement and the main measurement are performed for all the measurement points included in all the scan lines. FIG. 10 is a diagram for explaining the correction according to the first example. Description will be made below directing attention to a single scan line. The scan line $SL_{INIT}$ provided with a constant elevation angle is indicated by the line of dashes and dots. Description will be made assuming that there are two objects $OBJ_1$ and $OBJ_2$ at different horizontal distances $R_1$ and $R_2$, respectively. Here, the relation $R_2 > R_1$ holds true. Furthermore, description will be made assuming that the objects $OBJ_1$ and $OBJ_2$ are each a flat plane, and that distortion occurs in the scan line $SL_{INIT}$ when the elevation angle φ is controlled to be maintained at a constant value. Furthermore, the scan line $SL_{INIT}$ formed on the object $OBJ_2$ positioned at a far distance passes through the measurement points at heights that are smaller than those of the scan line $SL_{INIT}$ formed on the object $OBJ_1$ positioned at a near distance.

The corrected scan line $SL_{CMP}$ is indicated by the solid line. In the preliminary measurement, the scan beam hits the measurement points $P_{INIT}$ on the scan line $SL_{INIT}$ before the correction. With this arrangement, after the correction of the elevation angle φ, the measurement points $P_{CMP}$ are shifted to positions at the predetermined height $h_{REF}$.

Figure 4B:
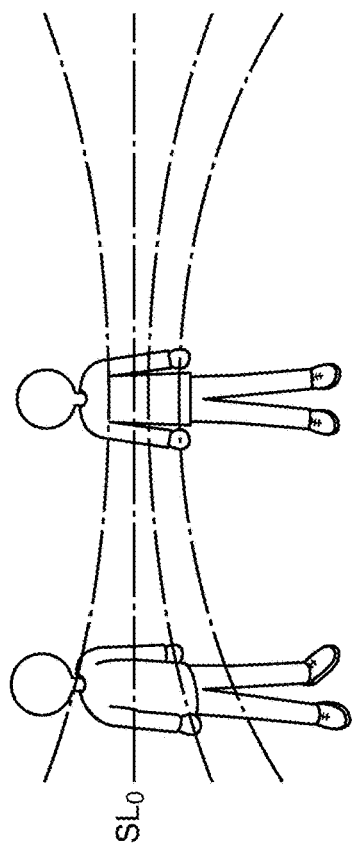
FIG. 4B is a diagram showing multiple scan lines obtained when a pedestrian is measured.

As a result, in each object, the scan line $SL_{CMP}$ is provided at a substantially constant height. This reduces the occurrence of distortion of the image. That is to say, this example is capable of solving the problem 2 relating to FIG. 4A and the problem 3 relating to FIG. 4B.

Relating to the problem 2, it can be understood that, when an object OBJ that is a substantially flat plane is scanned, the controller 104 controls the elevation angle φ of the three-dimensional sensor 102 such that the height of each scan line is maintained at a constant level independently of the scan angle θ.

Furthermore, in a comparison between the two objects $OBJ_1$ and $OBJ_2$, this arrangement is capable of setting the height of each measurement point $P_{CMP}$ to the uniform height $h_{REF}$ regardless of a difference between the horizontal distances $R_1$ and $R_2$. That is to say, this arrangement is capable of solving the problem 4 described with reference to FIG. 4.

Relating to the problem 4, it can be understood that the controller 104 controls the elevation angle of the three-dimensional sensor such that the height of each measurement point approaches the predetermined value $h_{REF}$ regardless of the horizontal distance R up to the measurement point.

By setting the reference height $h_{REF}$ for each scan line to that of the LiDAR used in machine learning, this arrangement is capable of solving the problem 1. Alternatively, this arrangement is capable of raising the degree of freedom in installing the LiDAR in a vehicle.

It should be noted that, with the correction processing according to the first example, such an arrangement requires the distance measurement twice for each of the measurement points. This reduces the frame rate to 1/2. In order to solve such a problem, the correction may be performed once for every predetermined number of multiple frames.

SECOND EXAMPLE

Figure 11:
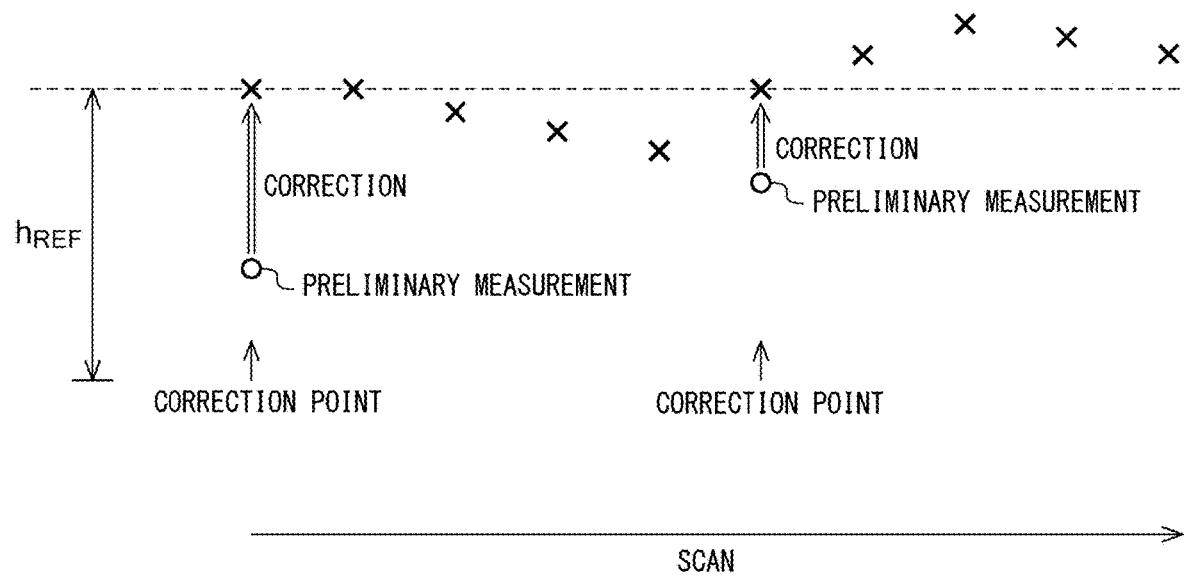
FIG. 11 is a diagram for explaining correction processing according to a second example.

FIG. 11 is a diagram for explaining correction processing according to a second example. In the second example, multiple measurement points are selected as the correction points in the scan direction in a discrete manner. The measurement points between a given correction point and the next correction point are measured using the corrected angle $\varphi_{CMP}$ acquired in the immediately previous correction.

At least one measurement point may preferably be set for the object OBJ in a discrete manner, for example. A new object OBJ may be detected based on a large discontinuity in the distance r.

Figure 5:
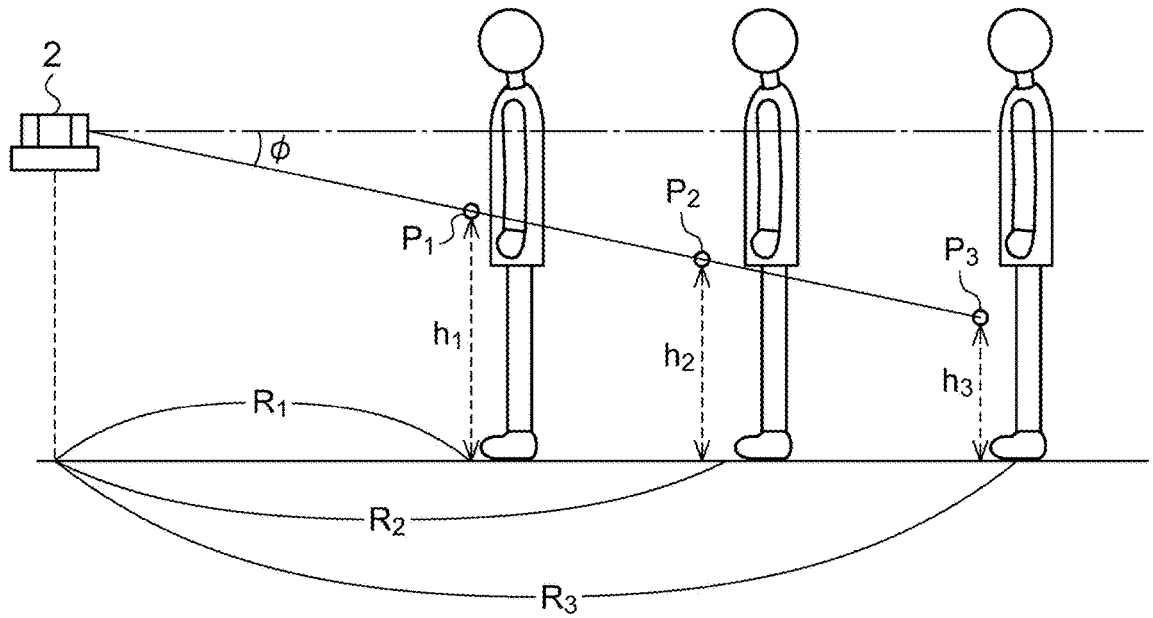
FIG. 5 is a diagram for explaining a problem 4.

With the second example, this arrangement is not capable of providing a perfectly uniform height h. However, this arrangement is capable of suppressing fluctuation of the height as compared with the measurement in a case in which the elevation angle is controlled to be maintained at a constant value. By correcting the elevation angle for every object OBJ, such an arrangement is capable of solving the problem 3 relating to FIG. 4B and the problem 4 relating to FIG. 5.

Figure 4A:
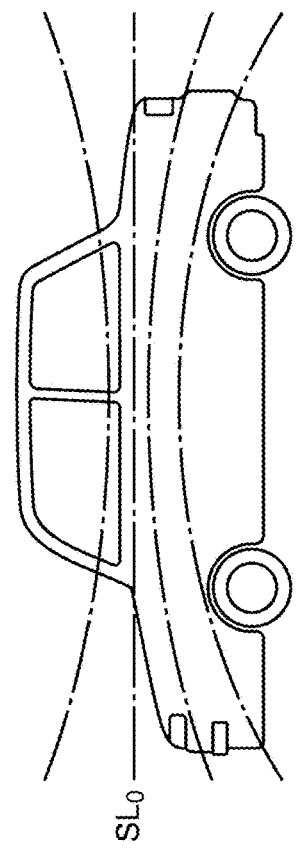
FIG. 4A is a diagram showing multiple scan lines obtained when an automobile is measured from a side.

With the second example, in some cases, this arrangement is not capable of solving the problem relating to FIG. 4A. In this case, this arrangement may preferably measure a similar distorted image in machine learning.

Figure 12:
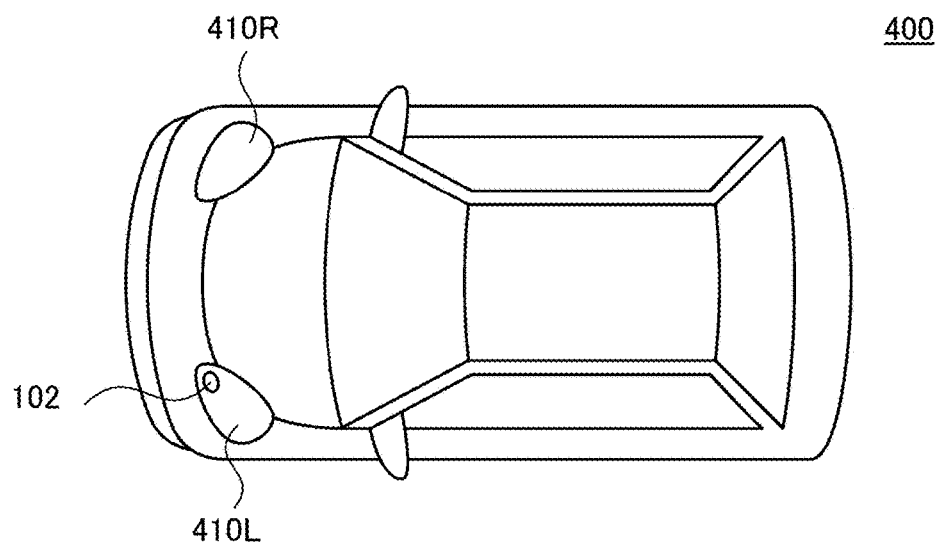
FIG. 12 is a block diagram showing an automobile including an object recognition system.

FIG. 12 is a block diagram showing an automobile 400 including the object recognition system 200. The automobile 400 includes headlamps 410. From among the components of the object recognition system 200, at least the three-dimensional sensor 102 is built into the headlamp 410. Also, the controller 104 may be built into the headlamp 410. Each headlamp 410 is positioned at a frontmost end of the vehicle body, which is most advantageous as a position where the three-dimensional sensor 102 is to be installed for detecting an object in the vicinity. The object recognition processing unit 210 may be built into the headlamp 410. Also, the object recognition processing unit 410 may be provided to the vehicle side.

Figure 13:
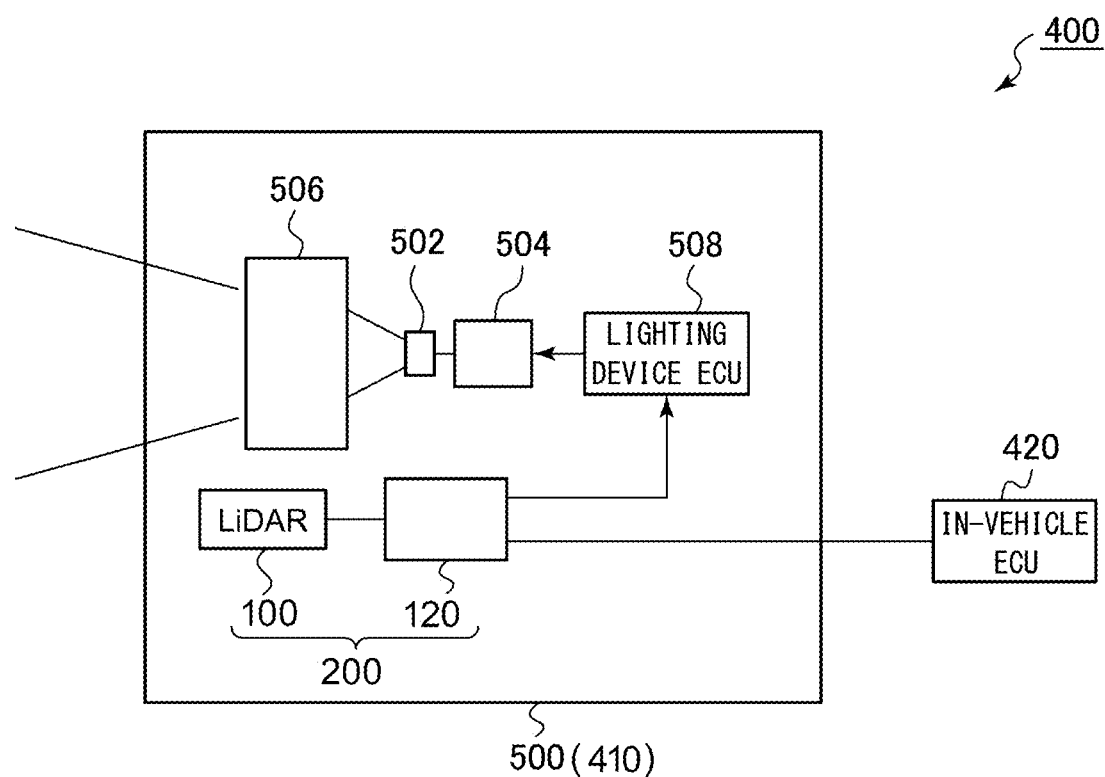
FIG. 13 is a block diagram showing an automotive lamp including an object recognition system.

FIG. 13 is a block diagram showing an automotive lamp 500 including the object recognition system 200. The automotive lamp 500 includes a light source 502, a lighting circuit 504, an optical system 506, and a lighting device ECU 508. Furthermore, the automotive lamp 500 is provided with the object recognition system 200.

The information with respect to the object OBJ detected by the object recognition processing unit 210 is transmitted to the in-vehicle ECU 420. The in-vehicle ECU 420 may support autonomous driving based on the information thus transmitted.

Also, the information with respect to the object OBJ detected by the object recognition processing unit 210 may be used to support light distribution control of the automotive lamp 500 (ADB: Adaptive Driving Beam). Specifically, the lighting device ECU 508 generates a suitable light distribution pattern based on the information with respect to the class of the object OBJ generated by the object recognition processing unit 210 and the position of the object OBJ. The lighting circuit 504 and the optical system 506 operate so as to provide the light distribution pattern thus generated by the lighting device ECU 508.

Description has been made above regarding an aspect of the present invention with reference to the first embodiment. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Description will be made below regarding such modifications relating to the first embodiment.

Description has been made in the first embodiment regarding an example in which the three-dimensional sensor 102 is configured as a LiDAR. However, the technique according to the present invention is not restricted to such an application.

Second Embodiment

Figure 14:
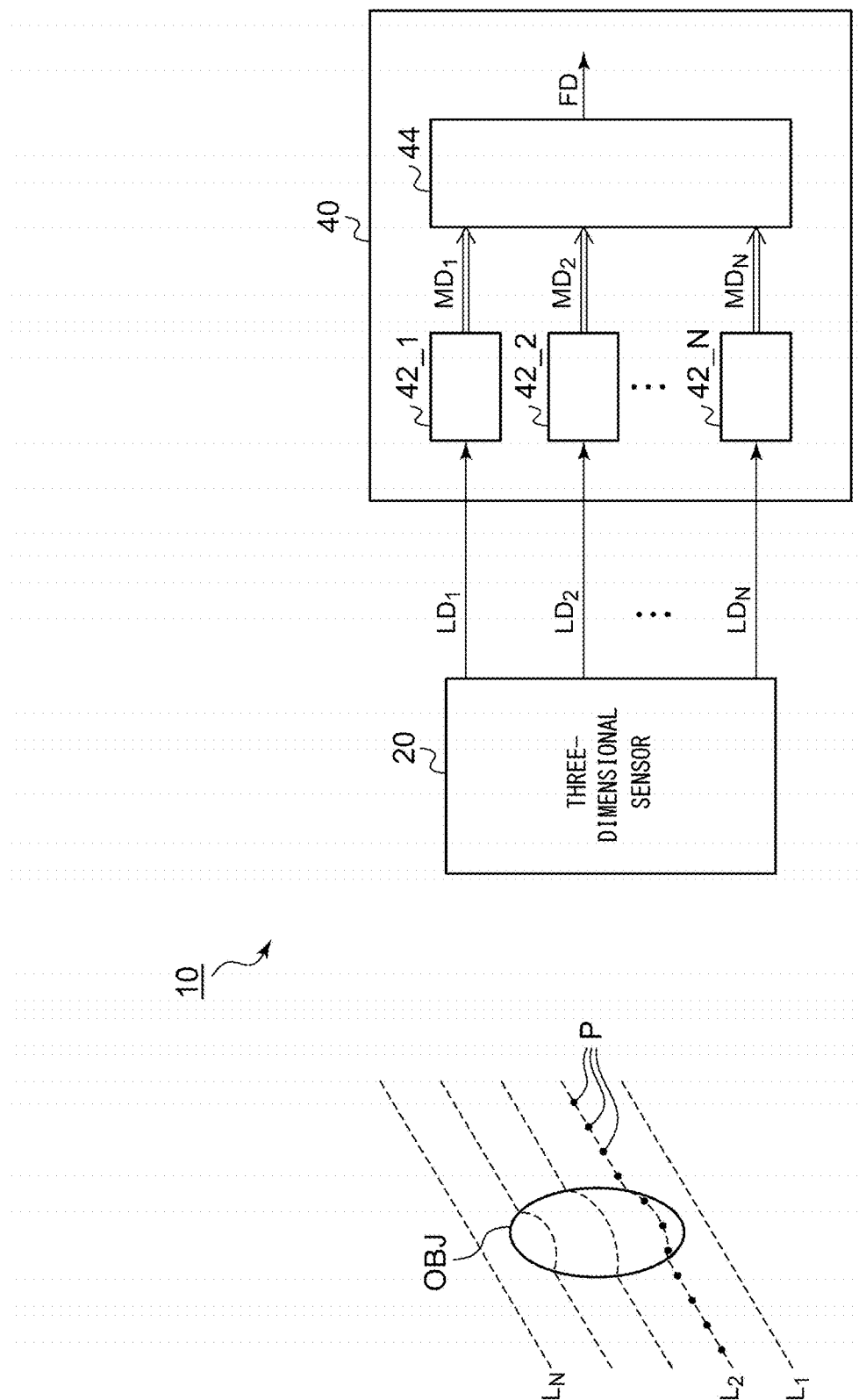
FIG. 14 is a block diagram showing an object recognition system according to a second embodiment.

FIG. 14 is a block diagram showing an object recognition system 10 according to a second embodiment. The object recognition system 10 is configured as an in-vehicle system to be mounted on a vehicle such as an automobile, motorcycle, or the like. The object recognition system 10 judges the class (which is also referred to as a "category") of the object OBJ in the vicinity of the vehicle.

The object recognition system 10 mainly includes a three-dimensional sensor 20 and a processing device 40. The three-dimensional sensor 20 generates multiple items of line data $LD_1$ through $LD_N$ with respect to multiple horizontal lines $L_1$ through $L_N$ defined with different heights. The number N of the horizontal lines is not restricted in particular. Specifically, the number N of the horizontal lines is set to 20 or less, and is preferably set on the order of 4 to 12. Each item of line data LD includes distance information with respect to the distance up to each of multiple sampling points P defined along the corresponding horizontal line L. The data set of the multiple items of line data $LD_1$ through $LD_N$ will be referred to as "distance measurement data". The three-dimensional sensor 20 is not restricted in particular. However, in a case in which there is a need to identify an object with small irregularities, such as a pedestrian, with high precision, a LiDAR is preferably employed. The number N of the horizontal lines represents a so-called resolution in the vertical direction. The configuration of the LiDAR is not restricted in particular. That is to say, the LiDAR may be configured as a scanning LiDAR or a non-scanning LiDAR.

The processing device 40 identifies the class (category) of the object based on the measurement data including the multiple items of line data $LD_1$ through $LD_N$. The processing device 40 is configured to handle data including a single object as a processing target. In a case in which an item of distance measurement data includes multiple objects, the distance measurement data is divided by pre-processing into multiple sub-frames each including a single object. The processing device 40 handles each sub-frame as a processing unit.

The processing device 40 may be provided as a processor (hardware component) such as a CPU (Central Processing Unit), GPU (Graphics Processing Unit), microcontroller, or the like, and a software program to be executed by the processor (hardware component). The processing device 40 may be configured as a combination of multiple processors.

For example, examples of the class of the object include a pedestrian, bicycle, automobile, pole, and the like. Regarding a pedestrian, a pedestrian as viewed from the front, a pedestrian as viewed from the rear, and a pedestrian as viewed from the side may be classified and defined as the same class of object. The same can be said of an automobile and bicycle. In the present embodiment, this definition is employed.

Figure 15:
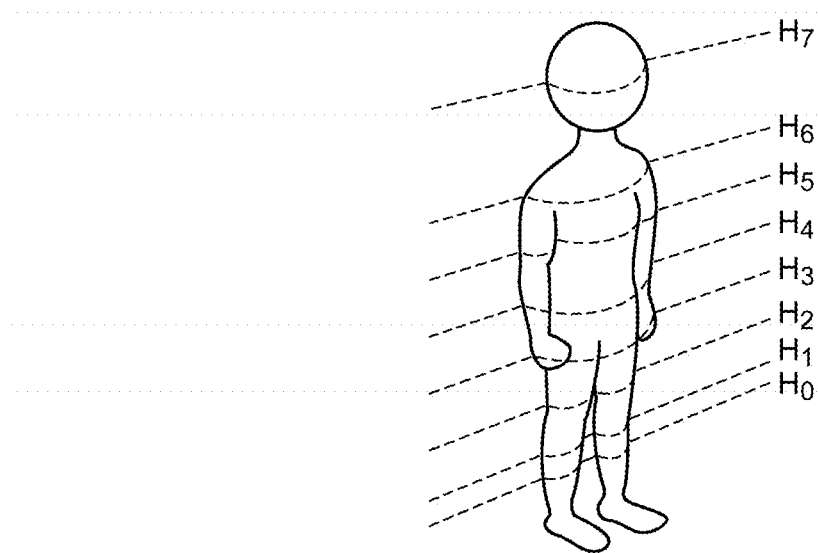
FIG. 15 is a diagram showing an example of multiple portions defined for a pedestrian.

With the present embodiment, the object OBJ is defined such that it has multiple portions (which will be referred to as "categories or sub-categories") positioned at different heights. FIG. 15 is a diagram showing an example of the multiple portions defined with respect to a pedestrian.

Regarding the pedestrian, M portions $H_0$ through $H_{M-1}$ are defined. Description will be made in the present embodiment regarding an arrangement in which M=N=8. Here, $H_0$ indicates the knees, $H_1$ indicates the upper above-the-knee portions, $H_2$ indicates the upper legs, $H_3$ indicates the waist, $H_4$ indicates the abdomen, $H_5$ indicates the chest, $H_6$ indicates the shoulders, and $H_7$ indicates the face.

In the same manner, regarding a bicycle, multiple portions $B_0$ through $B_7$ are defined at different heights. Also, regarding an automobile, multiple portions $C_0$ through $C_7$ are defined at different heights. Regarding a pole, multiple portions $P_0$ through $P_7$ can be defined at different heights. However, there is substantially no difference between portions regardless of height. Accordingly, there is no need to distinguish the multiple portions $P_0$ through $P_7$. That is to say, the data of a pole is handled as a single output $P_0$.

FIGS. 16A through 16D are diagrams showing multiple items of line data of a pedestrian, bicycle, automobile, and pole acquired by the three-dimensional sensor 20. In FIGS. 16A through 16D, the multiple items of line data represent the shapes of multiple portions defined beforehand.

Figure 1B:
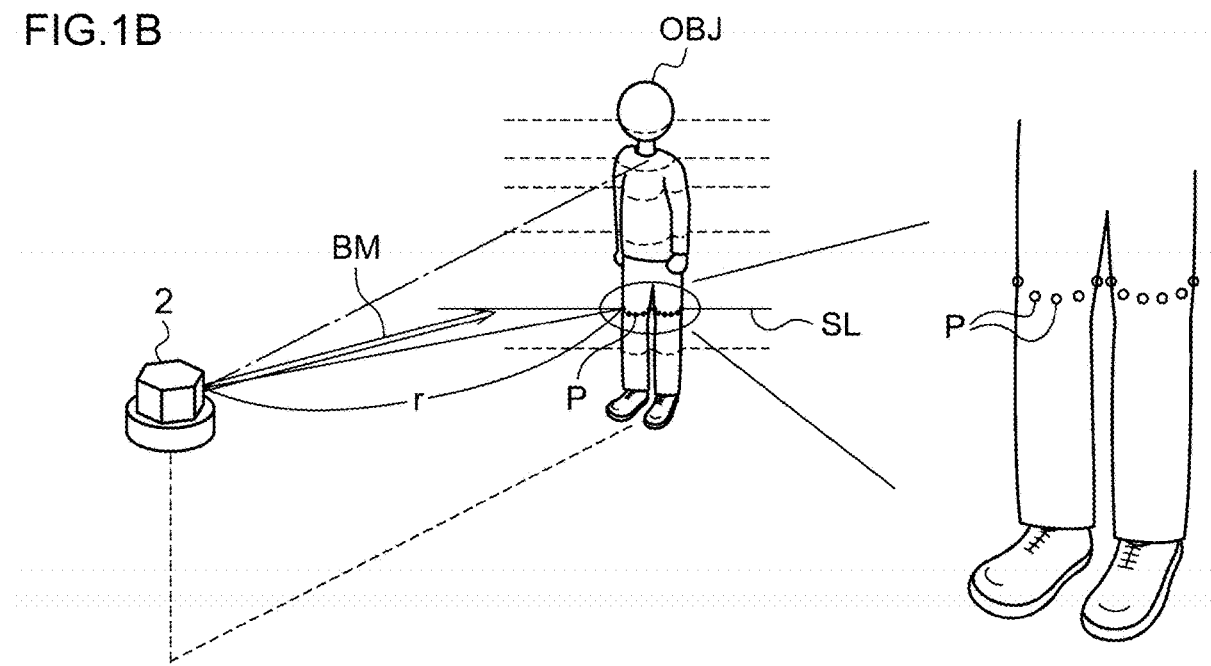
Figure 2:
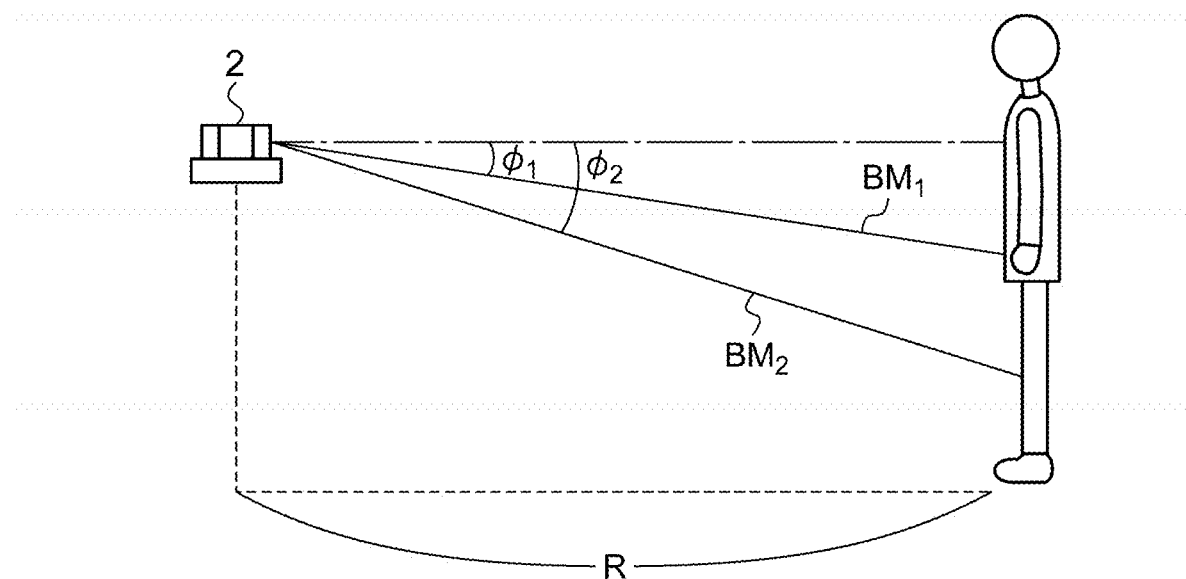
FIG. 2 is a diagram for explaining sensing supported by two LiDARs designed with different specifications.
Figure 3:
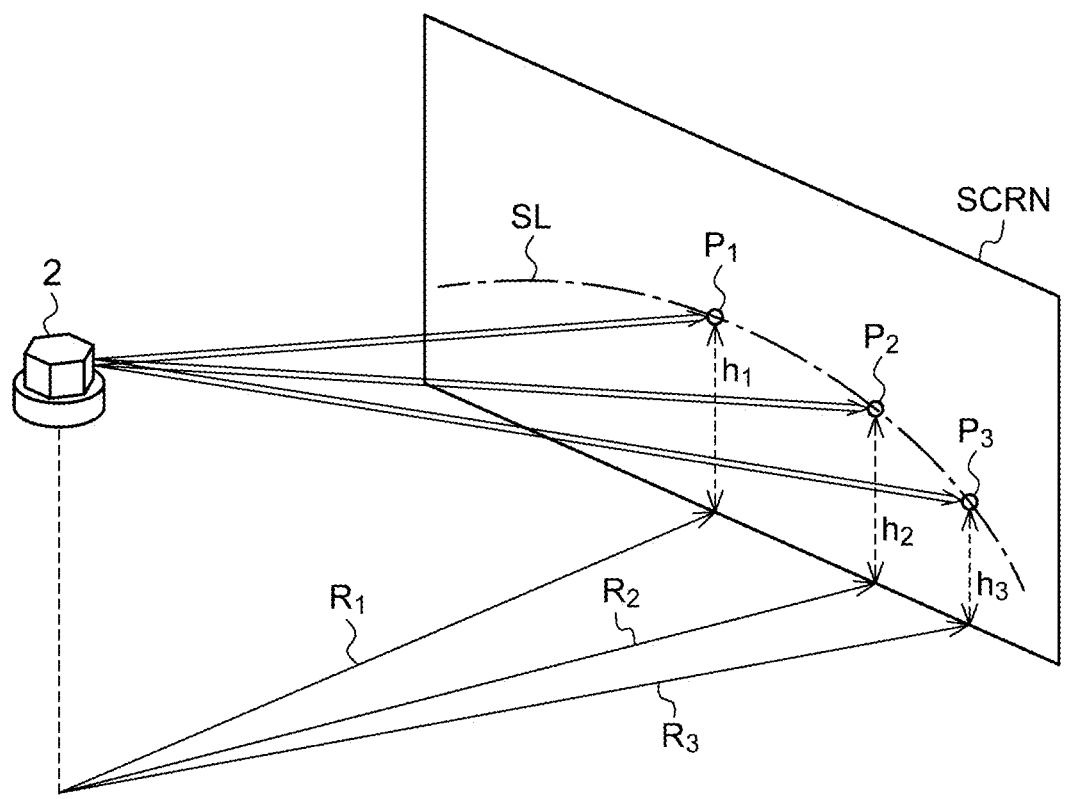
FIG. 3 is a diagram for explaining a problem 2.

Returning to FIGS. 1A-1B, the processing device 40 generates intermediate data MD with respect to the class of the object OBJ and the portion thereof for each item of line data LD. The intermediate data $MD_i$ may indicate the class of the object OBJ and the portion thereof that corresponds to the line data $LD_i$ (horizontal line $L_i$) in a statistical manner.

Subsequently, the processing device 40 integrates the multiple items of intermediate data $MD_1$ through $MD_N$ that correspond to the multiple items of line data $LD_1$ through $LD_N$ so as to generate final data FD that indicates the class of the object OBJ. The final data FD may indicate the class of the object OBJ in a statistical manner.

As functional components, the processing device 40 includes multiple first calculation units 42_1 through 42_N and a second calculation unit 44. The blocks indicated by the calculation units 42 and 44 do not necessarily mean that such blocks are configured as independent hardware blocks. For example, in a case in which the processing device 40 is configured as a single core, the multiple calculation units 42 and 44 may correspond to the single core. In a case in which the processing device 40 includes multiple cores, each core may function as a corresponding one of the multiple calculation units 42 and 44.

The i-th ($1 \leq i \leq N$) calculation unit 42_i processes the corresponding line data $LD_i$ so as to generate the intermediate data $MD_i$. The second calculation unit 44 integrates the intermediate data $MD_1$ through $MD_N$ generated by the multiple first calculation units 42_1 through 42_N so as to generate the final data FD.

The above is the basic configuration of the object recognition system 10. The configuration of the processing device 40 is not restricted in particular. For example, the processing device 40 may be configured using a neural network. Description will be made below regarding a configuration evaluated by the present inventor. Description will be made with a neural network that corresponds to the first calculation unit 42 as a first neural network $NN_1$, and with a neural network that corresponds to the second calculation unit 44 as a second neural network $NN_2$.

Figure 17:
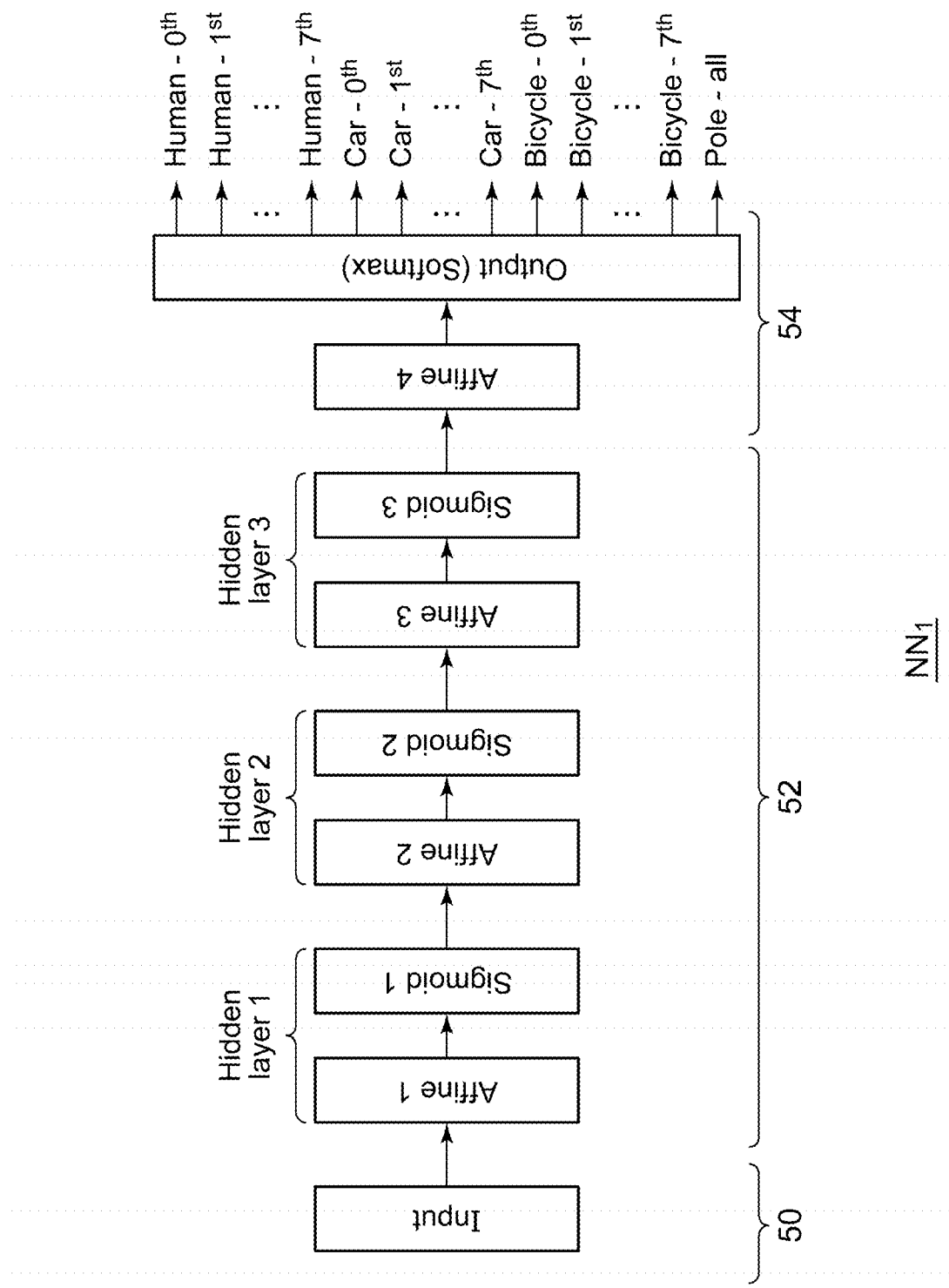
FIG. 17 is a block diagram showing an example configuration of a first neural network.

FIG. 17 is a block diagram showing an example configuration of the first neural network $NN_1$. The first neural network $NN_1$ is configured including an input layer 50, three intermediate layers (hidden layers) 52, and an output layer 54. The number of units of the input layer 50 is determined according to the number of sample points for each line, and specifically, is designed to be 5,200. The three intermediate layers are designed with the number of units of 200, 100, and 50, respectively. The intermediate layers 52 support transformation using affine transformation and a sigmoid function. The output layer 54 supports probability calculation using affine transformation and a softmax function.

In the output layer 54, a total of 25 categories, i.e., the categories of the portions $H_0$ through $H_7$ of a pedestrian, the categories of the portions $C_0$ through $C_7$ of an automobile, the categories of the portions $B_0$ through $B_7$ of a bicycle, and the category of the portion $P_0$ of a pole. The intermediate data $MD_i$ includes multiple items of data Human-0th through Human-7th, Car-0th through Car-7th, Bicycle-0th through Bicycle-7th, and Pole-all, which indicate the probabilities of a given portion to be identified matching the portions $H_0$ through $H_7$ of a pedestrian, the portions $C_0$ through $C_7$ of an automobile, the portions $B_0$ through $B_7$ of a bicycle, and the portion $P_0$ of a pole, respectively.

Figure 18:
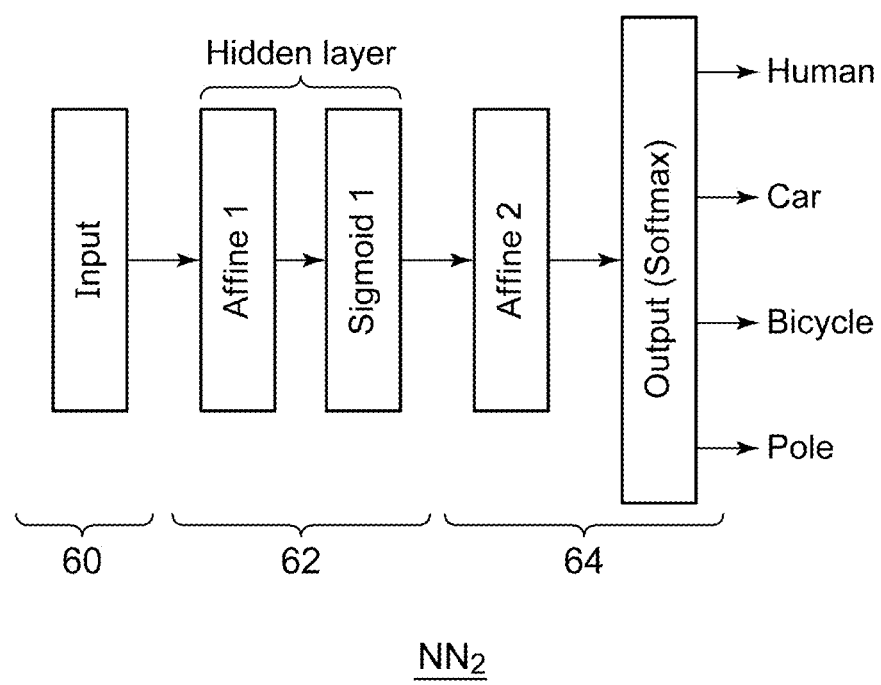
FIG. 18 is a block diagram showing an example configuration of a second neural network.

FIG. 18 is a block diagram showing an example configuration of the second neural network $NN_2$. The second neural network $NN_2$ is configured including an input layer 60, a single intermediate layer 62, and an output layer 64. The input layer 60 is designed such that the number of units thereof is a product of the number of the previous first neural networks $NN_1$ (N=8) and the number of categories (25), i.e., 200. The intermediate layer 62 is configured as a single layer designed such that the number of units is 50. The output layer 64 is designed so as to define four categories, i.e., the pedestrian category (Human), the automobile category (Car), the bicycle category (Bicycle), and the pole category (Pole). That is to say, the final data FD includes four items of data Human, Car, Bicycle, and Pole that correspond to the probabilities of a given object OBJ matching a pedestrian, automobile, bicycle, and pole, respectively.

As common settings, the first neural network $NN_1$ and the second neural network $NN_2$ are designed with the Adam method as the parameter update method, with a learning rate of 0.01, and with the number of iterations as 20,000.

As the preprocessing for the first neural network $NN_1$, extraction, shifting, and normalization are preferably performed.

Figure 19A:
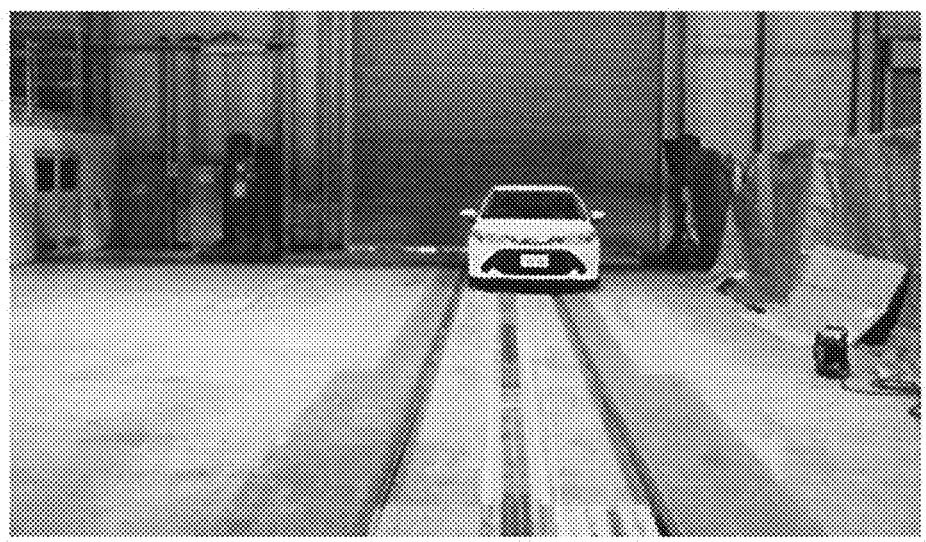
FIGS. 19A through 19C are diagrams for explaining extraction of the object.
Figure 19B:
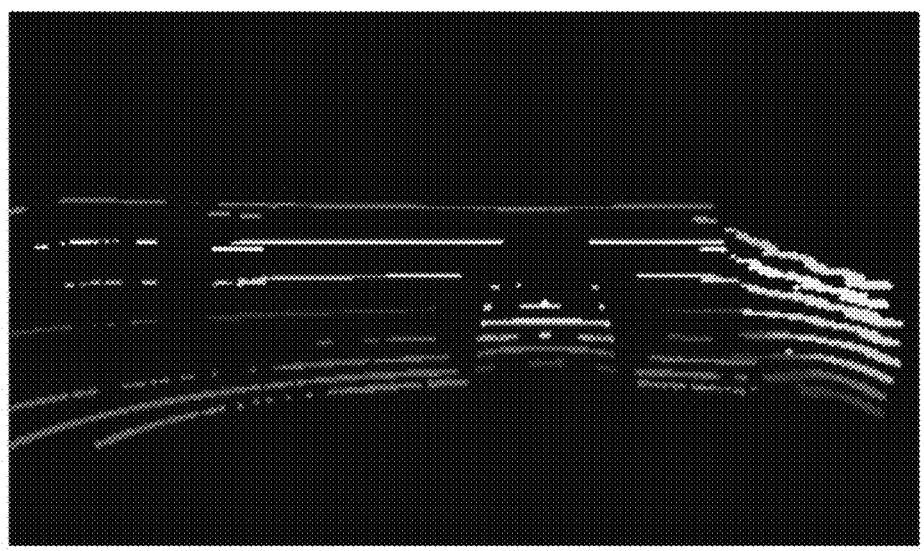
Figure 19C:
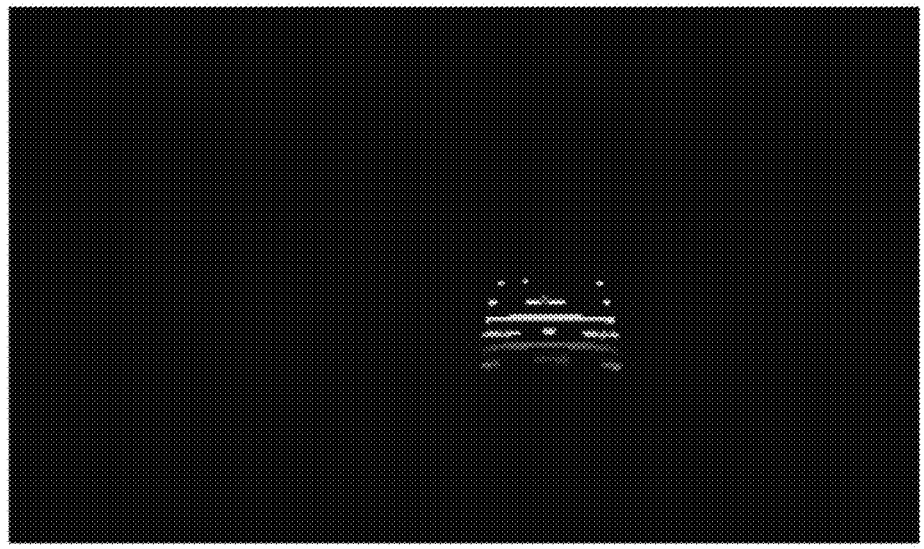

Extraction is processing for removing the background so as to extract the object OBJ. FIGS. 19A through 19C are diagrams for explaining the extraction of the object. FIG. 19A is a diagram showing an automobile employed as the object. FIG. 19B shows multiple items of line data $LD_1$ through $LD_8$ obtained when an image of the object shown in FIG. 19A is captured by means of the LiDAR. FIG. 19C shows the line data $LD_1$ through $LD_8$ extracted such that they include the object data.

Shifting is data shifting processing for shifting the object such that it is positioned at the center. Normalization is processing for dividing the distance data by a predetermined value. For example, as the predetermined value, the distance (reference distance) between the three-dimensional sensor 20 and a predetermined portion of the object OBJ set in the learning may be employed. This processing normalizes the line data such that it becomes a value in the vicinity of 1.

Figure 20A:
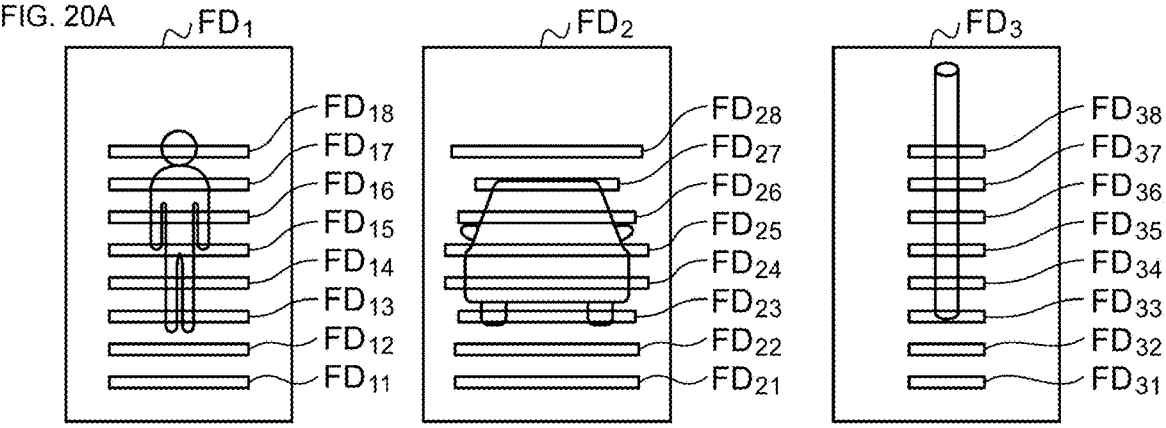
FIGS. 20A through 20C are diagrams for explaining a first learning method.
Figure 20B:
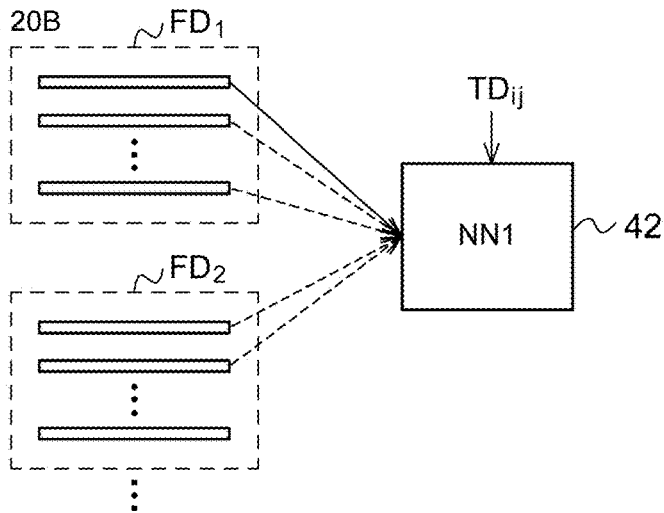
Figure 20C:
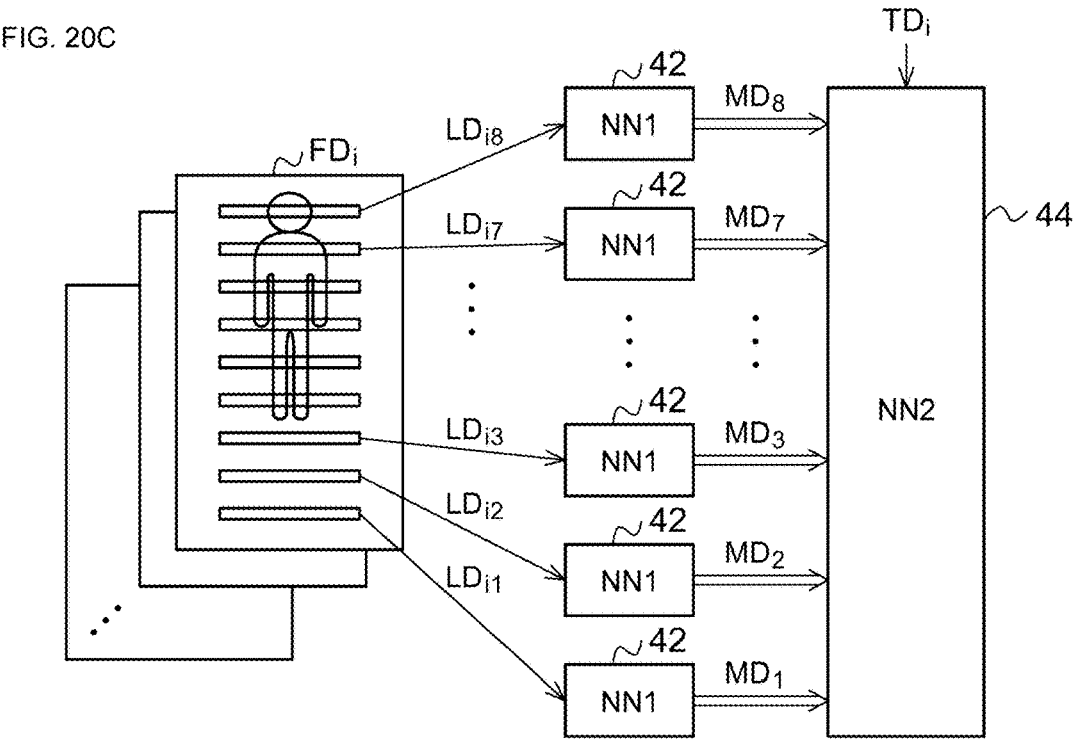

Next, description will be made regarding the machine learning. FIGS. 20A through 20C are diagrams for explaining a first learning method. As shown in FIG. 20A, first, the data (learning data) to be used for learning is measured. The learning data is acquired by measuring multiple objects by means of LiDAR. Specifically, the object candidates (pedestrian, automobile, pole, person riding a bicycle, etc.) to be identified are measured under different conditions (e.g., at various distances and in various directions), so as to prepare frame data $FD_1$, $FD_2$, . . . , for learning. Each frame data $FD_i$ (i=1, 2, ...) includes N (eight, in this example) items of line data. However, in the learning, only the effective line data in which the line crosses the object may be used. For example, in a case in which the frame data $FD_1$ is acquired for a pedestrian, the lowermost two items of line data $LD_{11}$ and $LD_{12}$ cross the ground, and do not cross the pedestrian. Accordingly, judgment may be made that the line data $LD_{11}$ and $LD_{12}$ are not used in the learning.

Subsequently, learning is performed for the first calculation unit (first neural network) 42. As shown in FIG. 20B, multiple items of effective line data $LD_{ij}$ included in the multiple items of frame data are individually input to the first calculation unit 42 together with teaching data $TD_{ij}$. For example, when the line data $LD_{18}$ of the frame $FD_1$ is input, the teaching data $TD_{ij}$ that represents the class (category)= "pedestrian" and the portion (sub-category)="face of pedestrian" is input.

The learning results thus obtained with respect to such a single first calculation unit 42 are used for all the first calculation units 42. Subsequently, learning is performed for the second calculation unit 44. Specifically, as shown in FIG. 20C, the multiple first calculation units 42 are coupled to the second calculation unit (second neural network) 44. In this state, multiple items of frame data $FD_2$, $FD_2$, ..., are individually input to the processing device 40. A set of multiple items of intermediate data $MD_1$ through $MD_8$ is generated for each frame $FD_i$ by means of the multiple first calculation units 42, which is supplied to the second calculation unit 44 configured as a downstream stage. The second calculation unit 44 receives the teaching data $TD_i$ that indicates the class of the object included in the current frame data $FD_i$ in addition to the set of the intermediate data $MD_1$ through $MD_6$. For example, in a case in which the frame data $FD_i$ acquired by image capture for a pedestrian is input to the processing device 40, the teaching data $TD_1$ that indicates the class="pedestrian" is supplied to the second calculation unit 44. This processing is executed for the multiple items of frame data, thereby providing the learning for the second calculation unit 44.

Description will be made regarding an experiment executed in order to investigate the effects of the object recognition system 10 having the above-described configuration.

The LiDAR employed in this investigation was configured to provide eight horizontal lines. The horizontal lines were designed with irradiation angles of $-18.25°$, $-15.42°$, $-12.49°$, $-9.46°$, $-6.36°$, $-3.19°$, $0°$, and $3.2°$, in this order from the bottom (angular resolution in the vertical direction). The angular resolution in the horizontal direction is designed to be $0.035°$. The image capture range was designed to be a range of 0 to $180°$. Accordingly, each item of line data includes values of 5,200 (=180/0.035) sample points.

Figure 21A:
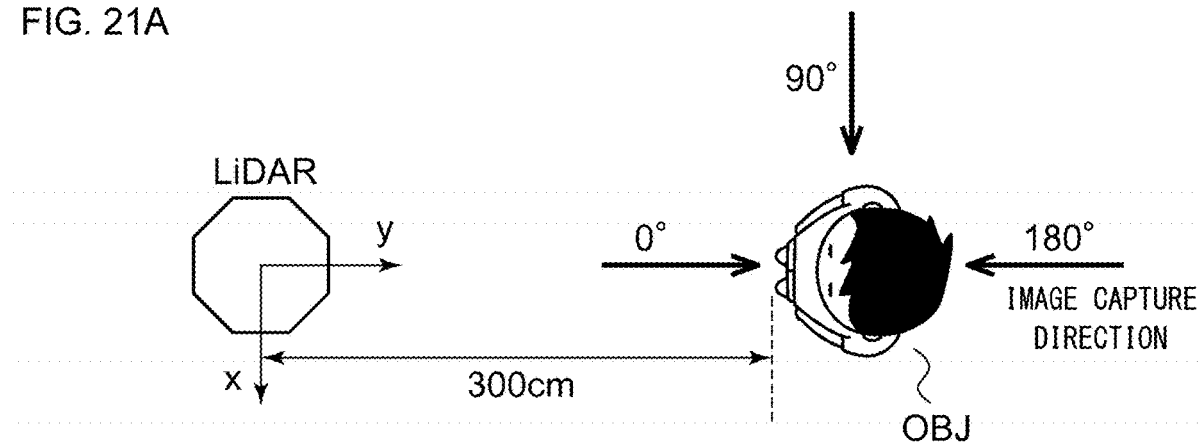
FIGS. 21A and 21B are diagrams for explaining image capture of a pedestrian.
Figure 21B:
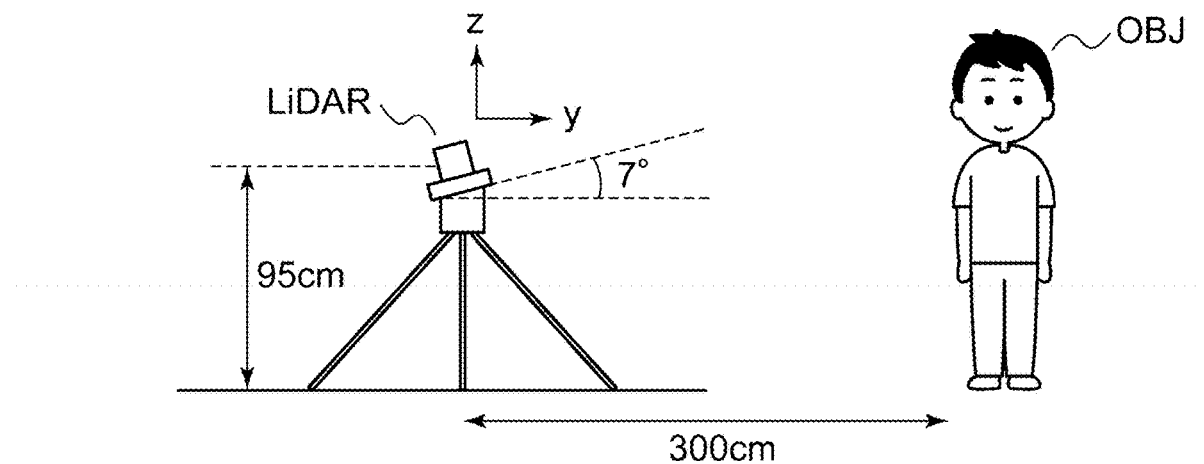

FIGS. 21A and 21B are diagrams for explaining image capture of a pedestrian. Description will be made regarding an example in which the distance (reference distance) from the center of the LiDAR up to the object OBJ is 3 m. Furthermore, description will be made assuming that the pedestrian sample is an adult male pedestrian with a height of 166 cm, and the object image is captured in nine directions (0°, 22.5°, 45°, 67.5°, 90°, 112.5°, 135°, 157.5°, and 180°). It should be noted that the direction in which the LiDAR faces the front (face, headlamp) of the object OBJ is defined to be 0°. Regarding the pedestrian, the LiDAR is set with a tilt angle (elevation angle) of 7° in the vertical direction such that the eight horizontal lines match the eight portions $H_0$ through $H_7$ shown in FIG. 15.

Figure 16A:
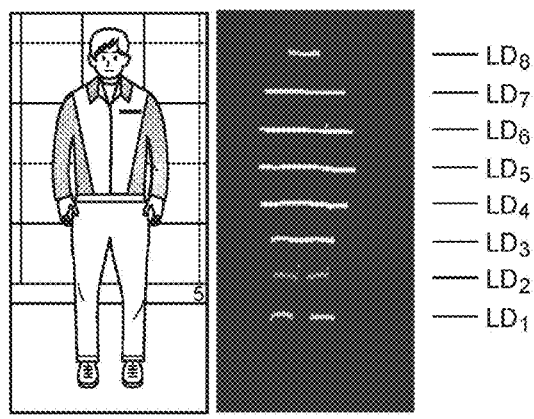
FIGS. 16A through 16D are diagrams showing multiple items of line data obtained when images of a pedestrian, bicycle, automobile, and pole are respectively captured.
Figure 16B:
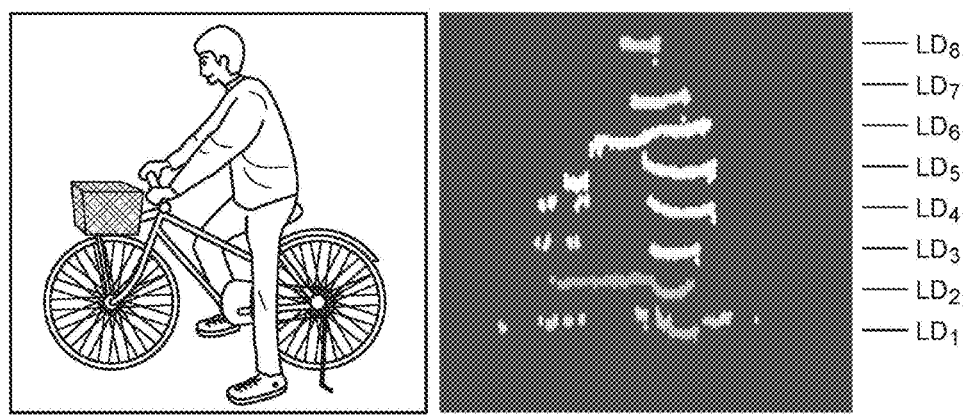
Figure 16C:
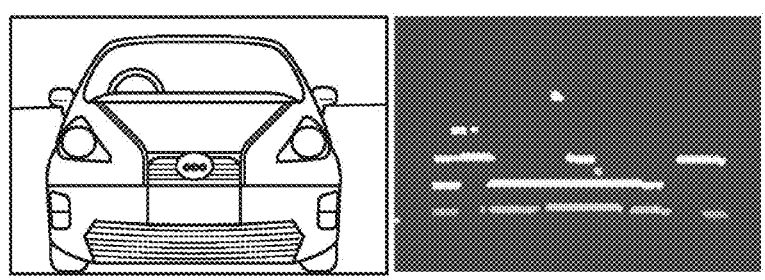
Figure 16D:
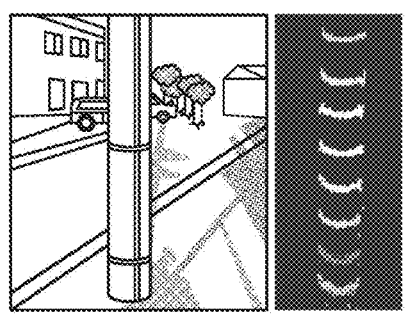

Regarding the bicycle, as shown in FIG. 16B, image data was acquired in a state in which a person was mounted on a stopped bicycle. The image data was acquired in nine directions in the same manner as in the image data acquisition for the pedestrian.

Regarding the automobile, image data was acquired for a single class of automobile in three directions (0°, 90°, and 180°). Regarding the pole, image data was acquired for six pole samples in an arbitrary direction.

The machine learning was performed for the pedestrian and the bicycle with 3,600 frames of training data, for the automobile with 3,000 frames of training data, and for the pole with 1,700 frames of training data. The learning method described with reference to FIGS. 20A through 20C was employed.

Subsequently, the learning results were evaluated for the pedestrian and the bicycle with 360 frames of test data, and for the automobile and the pole with 300 frames of test data. FIG. 22 is a diagram showing the accuracy rate for the classification of 25 categories (sub-categories) provided by the first neural network $NN_1$. The category "Total" shown at the top indicates the total accuracy rate of the classification of the 10,560 (=(360+360+300+300) frames×8 lines) items of line data thus input as the test data. The other categories represent the accuracy rates for the classification of the respective portions of the pedestrian, automobile, bicycle, and pole.

FIG. 23 is a diagram showing the accuracy rates for the classification of the four categories provided by the second neural network $NN_2$. The category "Total" shown at the top indicates the total accuracy rate of the classification of the 1,320 (=360+360+300+300) frames thus input as the test data. The other categories represent the accuracy rates for the classification of the pedestrian (Human), automobile (Car), bicycle (Bicycle), and pole (Pole).

As can be understood from FIG. 23, this arrangement provides an accuracy rate of 100% for the pedestrian (Human), automobile (Car), and pole (Pole). However, this arrangement provides an accuracy rate of only 97.8% for only the bicycle (Bicycle). Accordingly, it can be understood that the total accuracy rate is affected by the degraded accuracy rate for the bicycle.

As described above, with the object recognition system 10 according to the second embodiment, this arrangement is capable of judging the class of the object with a dramatically high accuracy rate using only eight horizontal lines.

Furthermore, this arrangement requires only a small number of horizontal lines, i.e., only eight lines, thereby allowing the processing capacity required for the processing device 40 to be reduced.

In this example, the effects were evaluated with a fixed distance of 3 m between the object and the LiDAR. In actuality, the distance varies. Accordingly, the learning may preferably be performed for each range after various distances are classified into multiple ranges.

Figure 24:
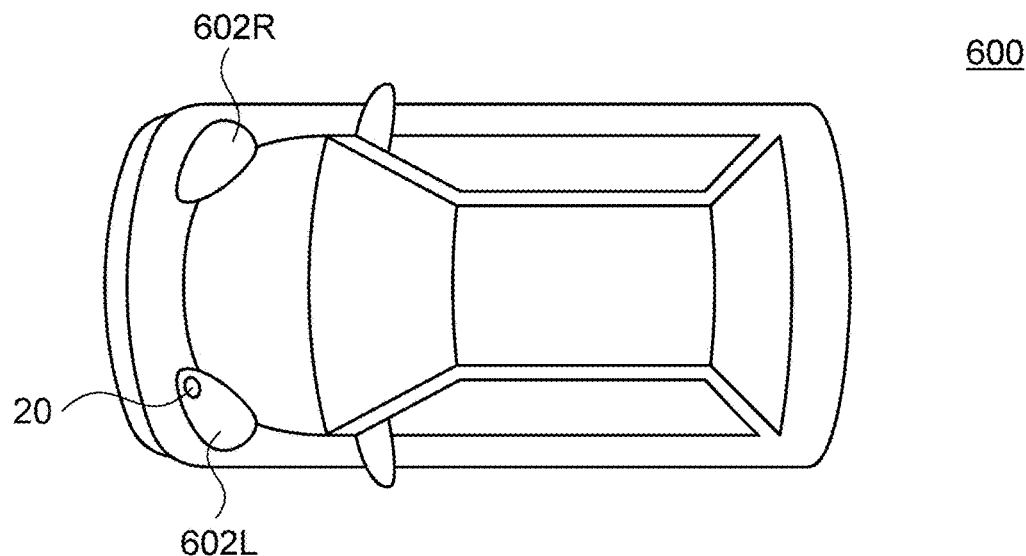
FIG. 24 is a block diagram showing an automobile including an object recognition system.

FIG. 24 is a block diagram showing an automobile 600 including the object recognition system 10. The automobile 600 includes headlamps 602L and 602R. From among the components of the object recognition system 10, at least the three-dimensional sensor 20 is built into at least one from among the headlamps 602L and 602R. Each headlamp 602 is positioned at a frontmost end of the vehicle body, which is most advantageous as a position where the three-dimensional sensor 20 is to be installed for detecting an object in the vicinity. The processing device 40 may be built into the headlamp 602. Also, the processing device 40 may be provided on the vehicle side. For example, from among the functions of the processing device 40, the function of generating the intermediate data may be provided by an internal component of the headlamp 602. Also, the function of generating the final data may be provided by another component on the vehicle side.

Figure 25:
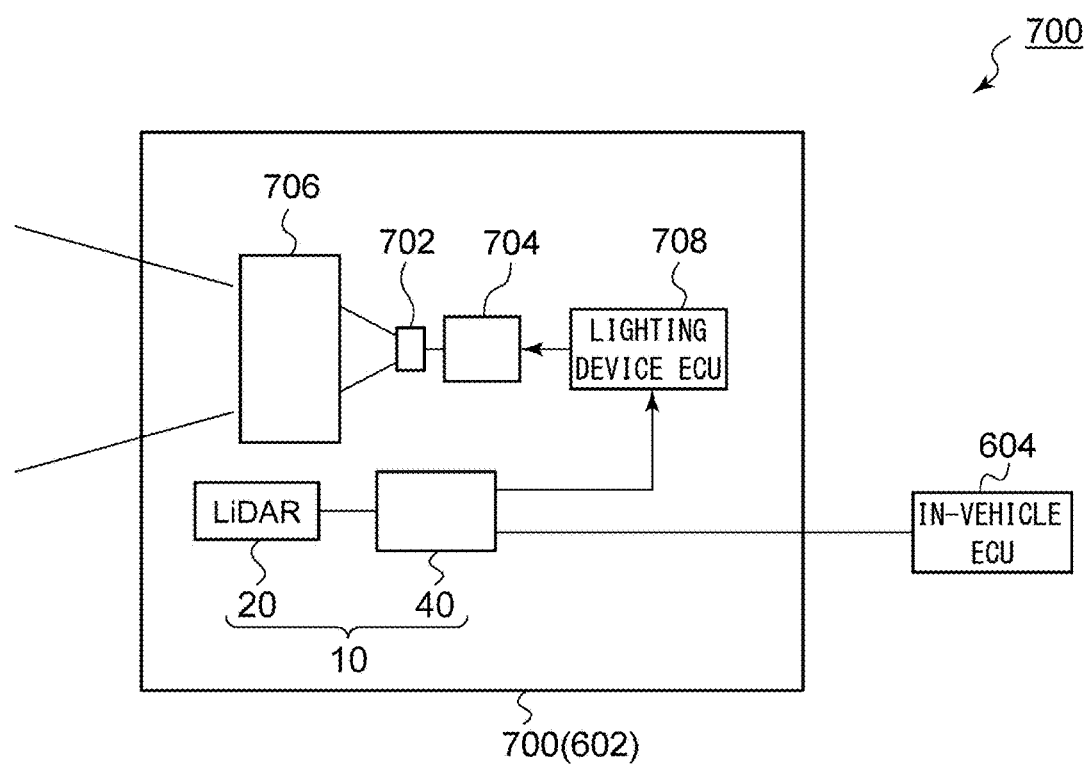
FIG. 25 is a block diagram showing an automotive lamp including an object recognition system.

FIG. 25 is a block diagram showing an automotive lamp 700 including the object recognition system 10. The automotive lamp 700 includes a light source 702, a lighting circuit 704, and an optical system 706. Furthermore, the automotive lamp 700 includes the three-dimensional sensor 20 and the processing device 40. The information with respect to the object OBJ detected by the processing device 40 is transmitted to the in-vehicle ECU 604. The in-vehicle ECU may support autonomous driving based on the information thus transmitted.

Also, the information with respect to the object OBJ detected by the processing device 40 may be used to support the light distribution control operation of the automotive lamp 700. Specifically, the lighting device ECU 708 generates a suitable light distribution pattern based on the information with respect to the class of the object OBJ and the position thereof thus generated by the processing device 40. The lighting circuit 704 and the optical system 706 operate so as to provide the light distribution pattern generated by the lighting device ECU 708.

Description has been made above regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Modification with Respect to Learning Method

Figure 26A:
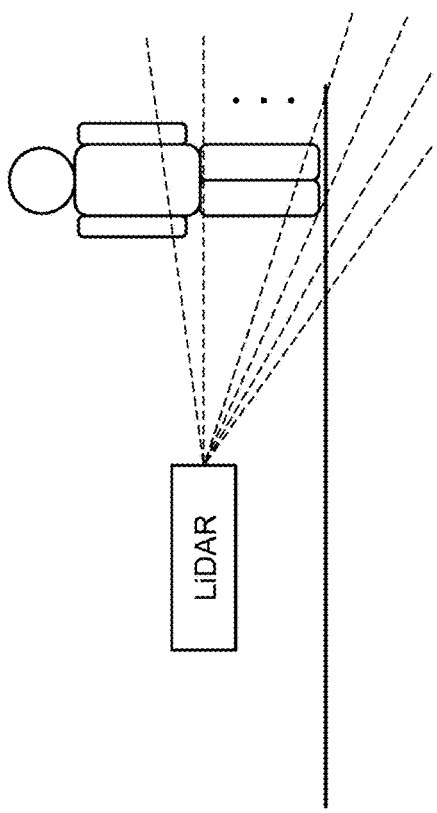
FIGS. 26A and 26B are diagrams showing the relation between the height of the LiDAR and the object.

With the first learning method shown in FIGS. 20A through 20C, in some cases, this arrangement involves learning that strongly depends on the installation of the LiDAR (height, elevation angle, or the distance up to the object). FIG. 26A shows a case in which the LiDAR is installed at a height of 145 cm in the learning. In this case, the lower three items of line data are ineffective. That is to say, the line data $LD_4$ through $LD_8$, which are the fourth line data through the eighth line data from the bottom, are used for the learning.

Figure 26B:
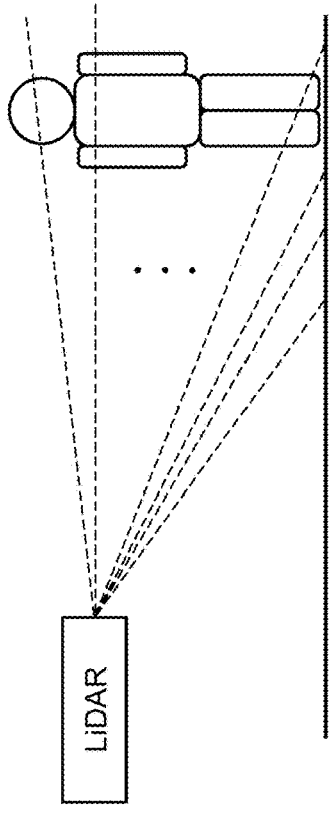

Description will be made assuming that, in the actual operation, as shown in FIG. 26B, the LiDAR is installed at a height of 70 cm, which is lower than that in the learning. Furthermore, description will be made assuming that the distance between the pedestrian and the LiDAR is smaller than that in the learning. In the state shown in FIG. 26B, the line data $LD_1$ through $LD_3$ match no particular portion (no particular sub-category). The line data $LD_4$ through $LD_7$ match the portion (sub-category)="legs". The line data $LD_8$ matches the portion (sub-category)="abdomen".

Figure 26C:
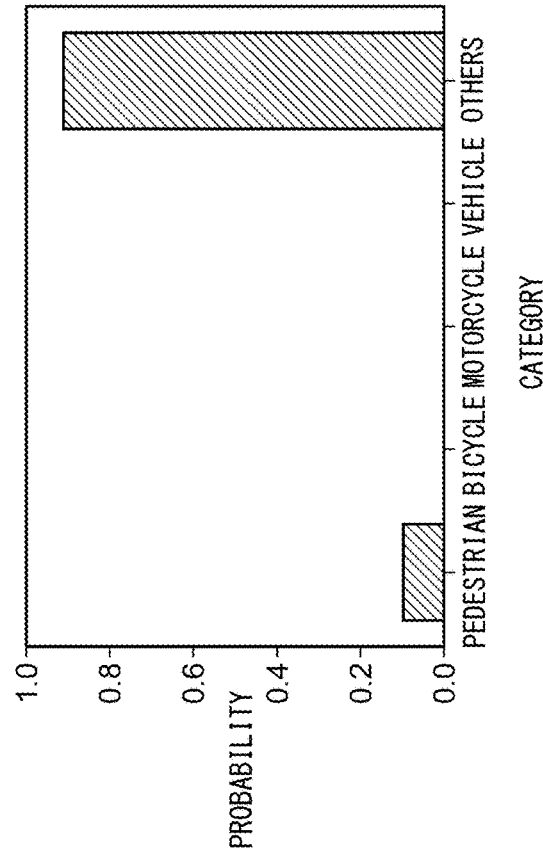
FIG. 26C is a diagram showing final data obtained in a situation shown in FIG. 26B by means of an object recognition system that has learned using the first learning method.

FIG. 26C shows the final data obtained by the object recognition system 10 in a situation shown in FIG. 26B in a case in which it has learned using the first learning method. In this case, the object must be identified as a pedestrian. However, false identification is obtained that there is a higher probability of other objects that differ from a pedestrian. It can be considered that this is because, with the first learning method, the classification supported by the second calculation unit 44 strongly depends on the definition order and combination of the sub-categories. That is to say, in a case of employing the first learning method, in some cases, such an arrangement has the potential to restrict the height at which the three-dimensional sensor is to be installed in actual use stage due to the height that was used in the learning stage. A second learning method is designed to have a function for reducing such a restriction.

Figure 27:
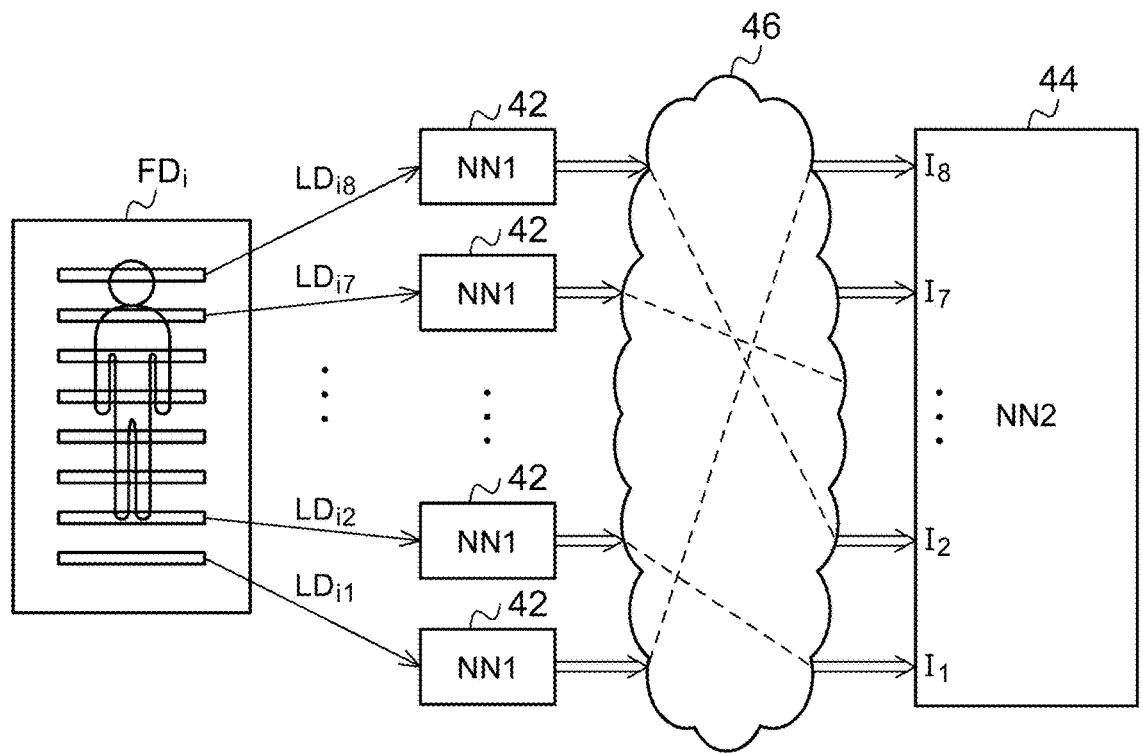
FIG. 27 is a diagram for explaining learning process for a second calculation unit using a second learning method.

With the second learning method, the first calculation units 42 each learn using the same learning method as with the first learning method. There is a difference in the learning method used for the second calculation unit 44 between the first and second learning methods. FIG. 27 is a diagram for explaining the learning process for the second calculation unit 44 using the second learning method. Specifically, in the second learning method, this arrangement instructs the second calculation unit 44 to learn while changing the correspondence relation 46 between the outputs of the multiple first calculation units 42 that have learned and multiple input nodes $I_1$ through $I_8$ of the second calculation unit 44. The correspondence relation 46 may be changed at random for each frame data $FD_i$.

In a case in which there is sufficient learning time, this arrangement may support the learning for each frame data $FD_i$ while switching the correspondence relation between multiple patterns. In a case in which N=8, there are 56 (=8×7) input/output combinations. Accordingly, this arrangement may support the learning for each frame data with respect to all the combinations.

Figure 28:
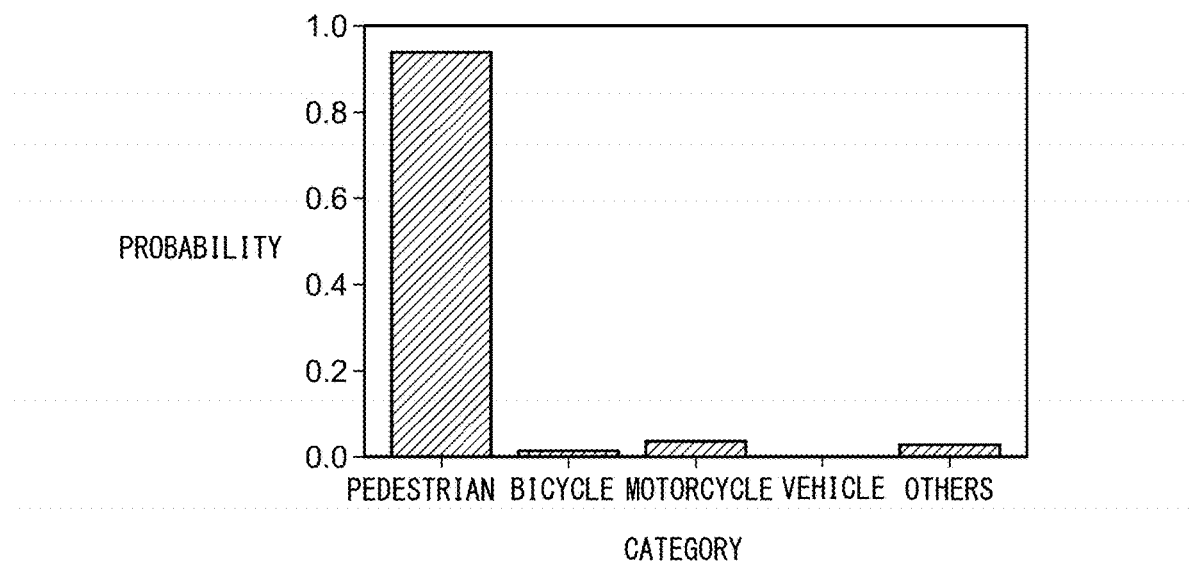
FIG. 28 is a diagram for explaining the effects of the second learning method.

FIG. 28 is a diagram for explaining the effect of the second learning method. FIG. 28 shows the final data FD obtained by the object recognition system 10 that has learned using the second learning method in a case in which a pedestrian is assumed in the situation shown in FIG. 26B. This arrangement allows the accuracy rate for the identification of a pedestrian to be raised as compared with the final data shown in FIG. 26C obtained using the first learning method.

As described above, in the learning step for the second calculation unit 44, the correspondence relation between the multiple first calculation units 42 and the multiple inputs of the second calculation unit 44 is changed. This arrangement allows the degree of freedom in installing the three-dimensional sensor such as the LiDAR or the like.

Figure 29:
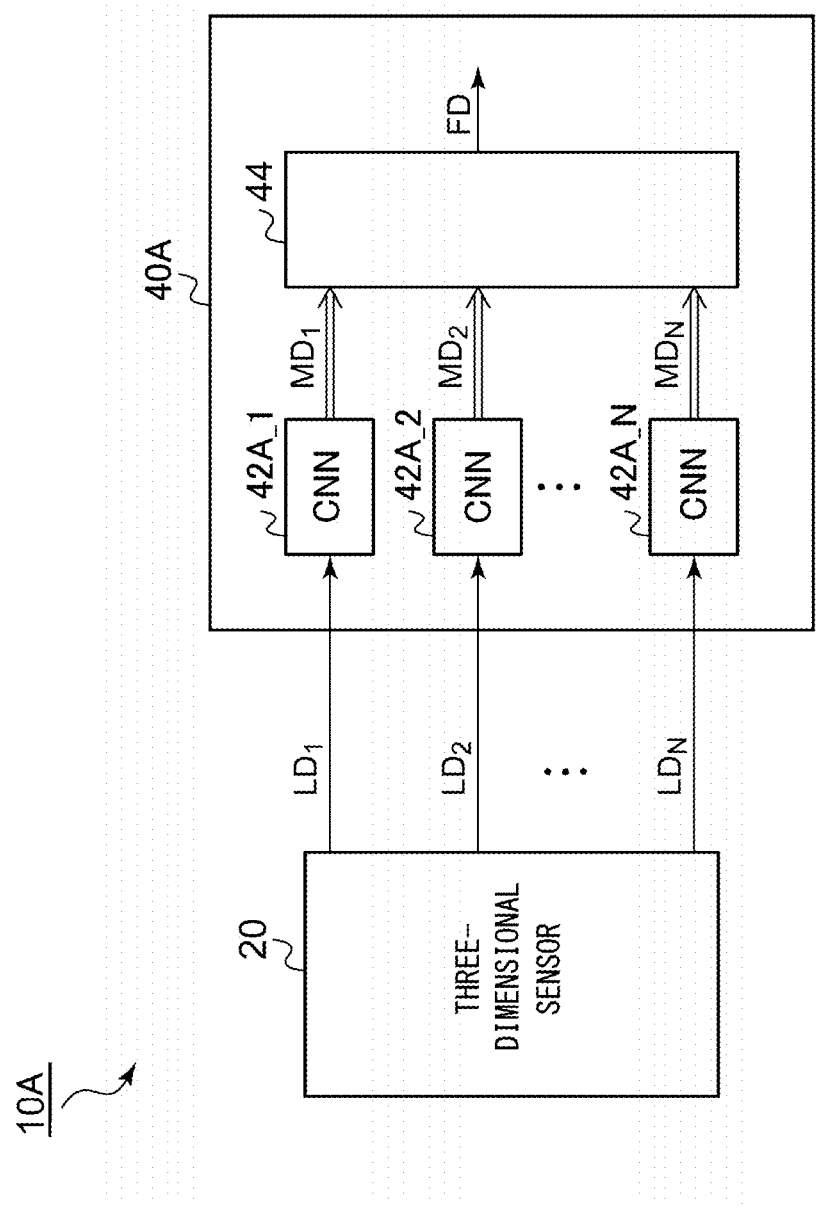
FIG. 29 is a block diagram showing an object recognition system according to a modification.

FIG. 29 is a block diagram showing an object recognition system 10A according to a modification. In this modification, first calculation units 42A are configured as a convolutional neural network. Typically, a convolutional neural network handles a two-dimensional image of N×N pixels. In the present embodiment, the convolutional neural network handles one-dimensional line data as a processing target, which is a new idea. The convolutional neural network is configured as a combination of a convolutional layer and a pooling layer. By employing such a convolutional neural network, such an arrangement allows the robustness to be improved for the position deviation of the object in the horizontal direction.

Other Modifications

Description has been made above regarding an arrangement in which the number N of the multiple items of line data is eight. Also, an arrangement may be made in which N is set to a value on the order of 4 to 12 giving consideration to the calculation power of the processing device 40 and the required object OBJ identification capability.

In an embodiment, the object may be defined as a different class (category) for each orientation as viewed from the user's vehicle. That is to say, the same object is identified as a different class according to the orientation thereof, e.g., whether or not the object is positioned with a face-to-face orientation with respect to the user's vehicle. This is because such identification is advantageous in estimating the object OBJ moving direction.

The processing device 40 may be configured of only a hardware component using an FPGA or the like.

Description has been made in the embodiment regarding the automotive object recognition system 10. However, the present invention is not restricted to such an application. For example, the object recognition system 10 may be fixedly installed on transportation infrastructure such as a traffic light, traffic sign, or the like. That is to say, the present invention is applicable to a fixed-point observation application. Description has been made regarding the present invention with reference to the embodiments using specific terms. However, the above-described embodiments show only an aspect of the mechanisms and applications of the present invention. Rather, various modifications and various changes in the layout can be made without departing from the spirit and scope of the present invention defined in appended claims.

The invention claimed is:

1. A recognition sensor comprising:
a three-dimensional sensor structured to sense a plurality of scan lines having different heights, wherein the three-dimensional sensor is structured to be controllable its elevation angle and the elevation angle is changed for each of the plurality of scan lines; and
a controller structured to control the elevation angle of the three-dimensional sensor such that, for each scan line, a height of a correction point selected from among a plurality of measurement points on the scan line approaches a predetermined value which is determined for the scan line.

2. A recognition sensor comprising:
a three-dimensional sensor structured to sense a plurality of scan lines having different heights, wherein the three-dimensional sensor is structured to be controllable its elevation angle and the elevation angle is changed for each of the plurality of scan lines; and
a controller structured to control the elevation angle of the three-dimensional sensor such that, for each scan line, a height of a measurement point included in the scan line approaches a predetermined value which is determined for the scan line regardless of a horizontal distance up to the measurement point.

3. A recognition sensor comprising:
a three-dimensional sensor structured to sense a plurality of scan lines having different heights, wherein the three-dimensional sensor is structured to be controllable its elevation angle and the elevation angle is changed for each of the plurality of scan lines; and
a controller structured to control the elevation angle of the three-dimensional sensor at each of measurement points included in the scan line such that heights of the measurement points included in the scan line have a constant height when scanning an object which is a substantially flat plane.

4. The recognition sensor according to claim 1, wherein the controller performs preliminary measurement for a correction point selected from among the plurality of measurement points,
and wherein the elevation angle to be used in the main measurement is calculated based on the distance and the elevation angle acquired in the preliminary measurement.

5. The recognition sensor according to claim 1, wherein the controller corrects the elevation angle for each of the measurement points.

6. The recognition sensor according to claim 1, wherein the controller corrects the elevation angle at least once for each scan line and for each object.

7. A motor vehicle comprising the recognition sensor according to claim 1.

8. An automotive lamp comprising the recognition sensor according to claim 1.

* * * * *